(12) United States Patent
Tanaka

(10) Patent No.: US 11,012,149 B2
(45) Date of Patent: May 18, 2021

(54) COMMUNICATION DEVICE AND TERMINAL DEVICE

(71) Applicant: Brother Kogyo Kabushiki Kaisha, Nagoya (JP)

(72) Inventor: Satoshi Tanaka, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 16/743,033

(22) Filed: Jan. 15, 2020

(65) Prior Publication Data

US 2020/0153501 A1 May 14, 2020

Related U.S. Application Data

(62) Division of application No. 16/130,755, filed on Sep. 13, 2018, now Pat. No. 10,581,516, which is a division of application No. 14/498,213, filed on Sep. 26, 2014, now Pat. No. 10,142,014.

(30) Foreign Application Priority Data

Sep. 30, 2013 (JP) ................................. 2013-204535

(51) Int. Cl.
*H04B 7/26* (2006.01)
*H04B 5/00* (2006.01)

(52) U.S. Cl.
CPC ............. *H04B 7/26* (2013.01); *H04B 5/0031* (2013.01)

(58) Field of Classification Search
CPC ...................................................... H04B 7/26
See application file for complete search history.

(56) References Cited

U.S. PATENT DOCUMENTS

| | | | |
|---|---|---|---|
| 7,209,706 B2 | 4/2007 | Fujii et al. | |
| 7,346,061 B2 | 3/2008 | Takayama et al. | |
| 7,457,417 B1 | 11/2008 | Mirza-Baig | |
| 8,189,225 B1 | 5/2012 | Lo et al. | |
| 8,380,183 B2 | 2/2013 | Misumi et al. | |
| 9,274,738 B2 | 3/2016 | Naruse | |
| 2003/0007606 A1 | 1/2003 | Suder et al. | |

(Continued)

FOREIGN PATENT DOCUMENTS

| | | |
|---|---|---|
| CN | 101253469 A | 8/2008 |
| CN | 101790183 A | 7/2010 |

(Continued)

OTHER PUBLICATIONS

Jul. 7, 2010—NFC FORUM Connection Handover Technical Specification 1.2.

(Continued)

*Primary Examiner* — Hsinchun Liao
(74) *Attorney, Agent, or Firm* — Banner & Witcoff, Ltd.

(57) ABSTRACT

A system and method for providing network information using a short-range wireless communication path between a communication device and a terminal device is described. In some examples, authentication information is required from the terminal device prior to communication of the network information. In some examples, the short-range wireless communication path is disconnected and reestablished in which one of the terminal device and the communication device changes operation modes of a short-range wireless interface.

20 Claims, 12 Drawing Sheets

(56) References Cited

U.S. PATENT DOCUMENTS

| | | |
|---|---|---|
| 2004/0116074 A1 | 6/2004 | Fujii et al. |
| 2004/0128555 A1 | 7/2004 | Saitoh et al. |
| 2004/0192264 A1 | 9/2004 | Liu et al. |
| 2004/0248514 A1 | 12/2004 | Idani et al. |
| 2005/0077356 A1 | 4/2005 | Takayama et al. |
| 2005/0088709 A1 | 4/2005 | Kizaki et al. |
| 2006/0101280 A1 | 5/2006 | Sakai |
| 2006/0126118 A1 | 6/2006 | Nagata |
| 2006/0128360 A1 | 6/2006 | Hibino |
| 2006/0245402 A1 | 11/2006 | Fujii et al. |
| 2007/0051803 A1 | 3/2007 | Tada et al. |
| 2007/0061573 A1 | 3/2007 | Dokuni et al. |
| 2007/0156726 A1 | 7/2007 | Levy |
| 2007/0190937 A1 | 8/2007 | Takayama |
| 2007/0190939 A1 | 8/2007 | Abel |
| 2007/0230332 A1 | 10/2007 | Fukasawa |
| 2008/0046570 A1 | 2/2008 | Abel |
| 2008/0052710 A1 | 2/2008 | Iwai et al. |
| 2008/0080392 A1 | 4/2008 | Walsh et al. |
| 2008/0084578 A1 | 4/2008 | Walker et al. |
| 2008/0113655 A1 | 5/2008 | Angelhag |
| 2008/0117847 A1 | 5/2008 | Hamada |
| 2008/0218810 A1 | 9/2008 | Itoh |
| 2008/0222711 A1 | 9/2008 | Michaelis |
| 2008/0231900 A1 | 9/2008 | Abe |
| 2008/0232405 A1 | 9/2008 | Gallo |
| 2008/0252415 A1 | 10/2008 | Larson et al. |
| 2008/0288958 A1 | 11/2008 | Ryoo et al. |
| 2008/0299907 A1 | 12/2008 | Takayama |
| 2009/0009299 A1 | 1/2009 | Ikeda et al. |
| 2009/0021764 A1 | 1/2009 | Kano |
| 2009/0023476 A1 | 1/2009 | Saarisalo et al. |
| 2009/0024768 A1 | 1/2009 | Maruyama et al. |
| 2009/0033972 A1 | 2/2009 | Kato |
| 2009/0036056 A1 | 2/2009 | Oshima et al. |
| 2009/0052348 A1 | 2/2009 | Kato et al. |
| 2009/0066998 A1 | 3/2009 | Kato |
| 2009/0073482 A1 | 3/2009 | Tsuchiya |
| 2009/0103124 A1 | 4/2009 | Kimura et al. |
| 2009/0147803 A1 | 6/2009 | Takayama |
| 2009/0192912 A1 | 7/2009 | Griffin et al. |
| 2009/0193500 A1 | 7/2009 | Griffin et al. |
| 2009/0247077 A1 | 10/2009 | Sklovsky et al. |
| 2009/0254908 A1 | 10/2009 | Klave et al. |
| 2009/0271519 A1 | 10/2009 | Helvick |
| 2009/0298426 A1 | 12/2009 | Helvick |
| 2010/0050189 A1 | 2/2010 | Sng |
| 2010/0058359 A1 | 3/2010 | Ferlitsch |
| 2010/0069008 A1 | 3/2010 | Oshima et al. |
| 2010/0077031 A1 | 3/2010 | Yoneda et al. |
| 2010/0078471 A1 | 4/2010 | Lin et al. |
| 2010/0078472 A1 | 4/2010 | Lin et al. |
| 2010/0081385 A1 | 4/2010 | Lin et al. |
| 2010/0082485 A1 | 4/2010 | Lin et al. |
| 2010/0130127 A1 | 5/2010 | Takayama |
| 2010/0151790 A1 | 6/2010 | Hoeksel et al. |
| 2010/0186063 A1 | 7/2010 | Oba et al. |
| 2010/0188695 A1 | 7/2010 | Okigami |
| 2010/0207735 A1 | 8/2010 | Kim |
| 2010/0207742 A1 | 8/2010 | Buhot et al. |
| 2010/0221999 A1 | 9/2010 | Braun et al. |
| 2010/0241857 A1 | 9/2010 | Okude et al. |
| 2010/0311330 A1 | 12/2010 | Aibara et al. |
| 2010/0318712 A1 | 12/2010 | Boldyrev et al. |
| 2010/0330910 A1 | 12/2010 | Yan et al. |
| 2011/0002005 A1 | 1/2011 | Ashmore |
| 2011/0026068 A1 | 2/2011 | Yoshida |
| 2011/0028091 A1 | 2/2011 | Higgins et al. |
| 2011/0065385 A1 | 3/2011 | Geslin et al. |
| 2011/0075186 A1 | 3/2011 | Azuma |
| 2011/0090830 A1 | 4/2011 | Churei |
| 2011/0116125 A1 | 5/2011 | Park |
| 2011/0177780 A1 | 7/2011 | Sato et al. |
| 2011/0210618 A1 | 9/2011 | Takasu |
| 2011/0226853 A1 | 9/2011 | Soh et al. |
| 2011/0234013 A1 | 9/2011 | Hatakeyama |
| 2011/0235085 A1 | 9/2011 | Jazayeri et al. |
| 2011/0244849 A1 | 10/2011 | Misumi et al. |
| 2011/0258322 A1 | 10/2011 | Luzzatti et al. |
| 2011/0267636 A1 | 11/2011 | Kamasuka |
| 2011/0275316 A1 | 11/2011 | Suumaki et al. |
| 2011/0292445 A1 | 12/2011 | Kato |
| 2012/0034868 A1 | 2/2012 | Fine et al. |
| 2012/0069772 A1 | 3/2012 | Byrne et al. |
| 2012/0099566 A1 | 4/2012 | Laine et al. |
| 2012/0100803 A1 | 4/2012 | Suumaki et al. |
| 2012/0101944 A1 | 4/2012 | Lin et al. |
| 2012/0124365 A1 | 5/2012 | Black et al. |
| 2012/0135681 A1 | 5/2012 | Adams et al. |
| 2012/0166338 A1 | 6/2012 | Agnelli et al. |
| 2012/0171952 A1 | 7/2012 | Ohira et al. |
| 2012/0173318 A1 | 7/2012 | Lee et al. |
| 2012/0194864 A1 | 8/2012 | Oshima et al. |
| 2012/0208461 A1 | 8/2012 | Choi et al. |
| 2012/0212325 A1 | 8/2012 | Kanemoto |
| 2012/0252405 A1 | 10/2012 | Lortz et al. |
| 2012/0297048 A1 | 11/2012 | Hsu |
| 2012/0300245 A1 | 11/2012 | Chatierjee et al. |
| 2012/0329390 A1 | 12/2012 | Kim |
| 2012/0330784 A1 | 12/2012 | Nahidipour |
| 2013/0009752 A1 | 1/2013 | Finkenzeller et al. |
| 2013/0040565 A1 | 2/2013 | Suzuki |
| 2013/0077124 A1 | 3/2013 | Vojak |
| 2013/0080276 A1 | 3/2013 | Granbery |
| 2013/0083358 A1 | 4/2013 | Suzuki |
| 2013/0097348 A1* | 4/2013 | Milbrandt ............... G06F 21/74 710/110 |
| 2013/0165042 A1 | 6/2013 | Gillespie et al. |
| 2013/0166969 A1 | 6/2013 | Zhang et al. |
| 2013/0196595 A1 | 8/2013 | Byrne et al. |
| 2013/0203347 A1 | 8/2013 | Moosavi |
| 2013/0204726 A1 | 8/2013 | Cruttenden et al. |
| 2013/0215467 A1 | 8/2013 | Fein et al. |
| 2013/0229683 A1 | 9/2013 | Nakayama |
| 2013/0229684 A1 | 9/2013 | Yasuzaki |
| 2013/0229690 A1 | 9/2013 | Sumita et al. |
| 2013/0244578 A1 | 9/2013 | Bacioccola |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1 | 11/2013 | Laracey |
| 2014/0002850 A1 | 1/2014 | Kang |
| 2014/0004793 A1* | 1/2014 | Bandyopadhyay ........................ H04W 12/003 455/41.1 |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1 | 2/2014 | Piratla et al. |
| 2014/0063537 A1 | 3/2014 | Nishikawa et al. |
| 2014/0068719 A1 | 3/2014 | Kiukkonen et al. |
| 2014/0085654 A1 | 3/2014 | Miyazaki |
| 2014/0104635 A1 | 4/2014 | Nishikawa |
| 2014/0114765 A1 | 4/2014 | Lee |
| 2014/0211237 A1 | 7/2014 | Tsuchitoi et al. |
| 2014/0219453 A1 | 8/2014 | Neafsey et al. |
| 2014/0252083 A1 | 9/2014 | Lee et al. |
| 2014/0256251 A1 | 9/2014 | Caceres et al. |
| 2014/0293980 A1 | 10/2014 | Shibata |
| 2014/0297892 A1 | 10/2014 | Kaigawa |
| 2014/0304596 A1 | 10/2014 | Chandran et al. |
| 2014/0355047 A1 | 12/2014 | Lee et al. |
| 2014/0359312 A1 | 12/2014 | Halibard et al. |
| 2014/0368859 A1 | 12/2014 | Gutnik et al. |
| 2014/0378052 A1 | 12/2014 | Hamada |
| 2014/0378060 A1 | 12/2014 | Akama |
| 2015/0093992 A1 | 4/2015 | Tanaka |
| 2015/0126115 A1 | 5/2015 | Yun et al. |
| 2015/0189595 A1 | 7/2015 | Shibao |
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0215481 A1 | 7/2015 | Faust |
| 2015/0220290 A1 | 8/2015 | Park et al. |

(56) References Cited

U.S. PATENT DOCUMENTS

| | | | |
|---|---|---|---|
| 2015/0270912 A1 | 9/2015 | Dhayni et al. |
| 2015/0280786 A1 | 10/2015 | Brat |
| 2015/0317116 A1 | 11/2015 | Suzuki et al. |
| 2015/0327172 A1 | 11/2015 | Kusakabe |
| 2015/0350905 A1 | 12/2015 | Suzuki |
| 2015/0382135 A1 | 12/2015 | Kawahara et al. |

FOREIGN PATENT DOCUMENTS

| | | | |
|---|---|---|---|
| CN | 103369637 A | 10/2013 |
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 200770047 A | 3/2007 |
| JP | 2007079639 A | 3/2007 |
| JP | 2007-166538 A | 6/2007 |
| JP | 2007221682 A | 8/2007 |
| JP | 2009-037566 A | 2/2009 |
| JP | 2009-135865 A | 6/2009 |
| JP | 2010501135 A | 1/2010 |
| JP | 2011-044092 A | 3/2011 |
| JP | 201187249 A | 4/2011 |
| JP | 2011073272 A | 4/2011 |
| JP | 2011-146991 A | 7/2011 |
| JP | 2011-188312 A | 9/2011 |
| JP | 2011-217063 A | 10/2011 |
| JP | 201260609 A | 3/2012 |
| JP | 2013505670 A | 2/2013 |
| JP | 2013-132491 A | 7/2013 |
| JP | 2013-187565 A | 9/2013 |
| JP | 2013-214139 A | 10/2013 |
| JP | 2013-214804 A | 10/2013 |
| JP | 2014071488 A | 4/2014 |
| JP | 2015-008382 A | 1/2015 |
| WO | 03061205 A1 | 7/2003 |
| WO | 2005/017738 A1 | 2/2005 |
| WO | 2008021032 A2 | 2/2008 |
| WO | 2011037725 A2 | 3/2011 |

OTHER PUBLICATIONS

Nov. 17, 2010—"NFC Digital Protocol," NFCForum-TS-DigitalProtocol-1.0.
Aug. 31, 2011—"Simple NDEF Exchange Protocol"—Technical Specification, SNEP 1.0, pp. 1-20.
Aug. 31, 2011—NFC Forum, Simple NDEF Exchange Protocol Technical Specification, NFC Forum, SNEP 1.0, NIFCForum-TS-SNEP_1.0.
Aug. 31, 2011—NFC Forum Simlple NDEF Exchange Protocol.
Jul. 4, 2012—Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012—Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
Jul. 2, 2013—(US) Co-pending U.S. Appl. No. 13/933,419.
Jul. 23, 2013—(EP) Extended Search Report—Application No. 13161732.6.
Mar. 15, 2013—(US) Co-Pending U.S. Appl. No. 13/834,434.
Sep. 23, 2013—(EP) Search Report—App 13174778.4.
Aug. 5, 2014—U.S. Non-Final Office Action—U.S. Appl. No. 13/933,419.
Dec. 12, 2014—U.S. Notice of Allowance—U.S. Appl. No. 13/834,423.
Jan. 17, 2014—(EP) Extended Search Report—App 13179154.3.
Jan. 17, 2014—(EP) Extended Search Report—App 13179157.6.
Jan. 17, 2014—(EP) Search Report—Application No. 13179289.7.
Mar. 13, 2014—U.S. Co-pending U.S. Appl. No. 14/208,220.
May 9, 2014—U.S. Non-Final Office Action—U.S. Appl. No. 13/833,236.
May 9, 2014—U.S. Non-Final Office Action—U.S. Appl. No. 13/834,423.
Nov. 26, 2014—U.S. Notice of Allowance—U.S. Appl. No. 13/933,419.
Oct. 20, 2014—U.S. Notice of Allowance—U.S. Appl. No. 13/833,236.
Oct. 27, 2014—(EP) Office Action—App 13159607.4.
Sep. 4, 2014—U.S. Final Office Action—U.S. Appl. No. 13/834,423.
Apr. 15, 2015—U.S. Non-Final Office Action—U.S. Appl. No. 13/959,786.
Aug. 31, 2015—U.S. Non-Final Office Action—U.S. Appl. No. 14/663,923.
Dec. 17, 2015—U.S. Notice of Allowance—U.S. Appl. No. 13/957,479.
Dec. 22, 2015—(CN) Notification of First Office action—App 201310339554.X—Eng Tran.
Dec. 22, 2015—(JP) Notification of Reasons for Rejection—App 2012-082818—Eng Tran.
Feb. 12, 2015—U.S. Non-Final Office Action—U.S. Appl. No. 13/957,490.
Feb. 13, 2015—U.S. Non-Final Office Action—U.S. Appl. No. 13/957,479.
Jul. 13, 2015—U.S. Final Office Action—U.S. Appl. No. 13/957,479.
Jul. 16, 2015—U.S. Final Office Action—U.S. Appl. No. 13/957,490.
Mar. 26, 2015—(US) Co-pending U.S. Appl. No. 14/669,553.
Mar. 31, 2015—U.S. Notice of Allowance—U.S. Appl. No. 13/834,423.
Mar. 6, 2015—(CN) Notification of First Office Action—App 201310097370.7.
May 22, 2015—U.S. Non-Final Office Action—U.S. Appl. No. 13/834,434.
Oct. 2, 2015—U.S.—Final Office Action—U.S. Appl. No. 13/959,786.
Oct. 8, 2015—(EP) Extended European Search Report—App 15169695.2.
Oct. 9, 2015—U.S. Non-Final Office Action—U.S. Appl. No. 14/706,368.
Oct. 14, 2015—(EP) Office Action—App 13179157.6.
Sep. 30, 2015—U.S. Notice of Allowance—U.S. Appl. No. 14/208,220.
Apr. 26, 2016—U.S. Non-Final Office Action—U.S. Appl. No. 13/959,786.
Aug. 11, 2016—U.S. Notice of Allowance—U.S. Appl. No. 13/959,786.
Aug. 23, 2016—U.S. Non-Final Office Action—U.S. Appl. No. 14/498,213.
Aug. 24, 2016—U.S. Notice of Allowance—U.S. Appl. No. 14/208,220.
Aug. 25, 2016—U.S. Non-Final Office Action—U.S. Appl. No. 13/834,434.
Aug. 9, 2013—U.S. Notice of Allowance—U.S. Appl. No. 13/957,479.
Feb. 17, 2016—U.S. Final Office Action—U.S. Appl. No. 14/706,368.
Feb. 25, 2016—U.S. Final Office Action—U.S. Appl. No. 13/834,434.
Jan. 12, 2016—(JP) Notification of Reasons for Rejection—App 2012-082819—Eng Tran.
Apr. 2, 2018—U.S. Final Office Action—U.S. Appl. No. 15/691,214.
Mar. 20, 2018—(JP) Notification of Reasons of Rejection—App 2014-113107—Eng Tran.
Apr. 28, 2018—(CN) First Office Action—App 201610330026.1, Eng Tran.
Jul. 10, 2018—(JP) Notification of Reasons for Rejection—App 2017-157066—Eng Tran.
Aug. 31, 2018—U.S. Non-final Office Action—U.S. Appl. No. 15/855,216.
Jan. 21, 2019—(CN) Notification of the Second Office Action—App 201610330026.1.
Feb. 19, 2019—(JP) Notification of Reasons for Rejection—App 2018-041165, Eng Tran.
Mar. 4, 2019—(EP) Summons to Attend Oral Proceedings—App 13161732.6.
Apr. 2, 2019—U.S. Non-Final Office Action—U.S. Appl. No. 15/904,973.
Jun. 13, 2019—U.S. Non-Final Office Action—U.S. Appl. No. 16/274,472.
Jun. 4, 2019—(CN) Office Action—App 201510279268.8.
U.S. Appl. No. 61/881,329, filed Sep. 23, 2013, Specification.

(56) References Cited

OTHER PUBLICATIONS

U.S. Appl. No. 61/881,329, filed Sep. 23, 2013, Drawings.
Oct. 23, 2019—(JP) Notification of Reasons for Rejection—App 2018-221816.
Dec. 26, 2019—U.S. Final Office Action—U.S. Appl. No. 16/274,472.
Jan. 25, 2016—U.S. Non-Final Office Action—U.S. Appl. No. 13/957,490.
Jan. 29, 2016—U.S. Notice of Allowance—U.S. Appl. No. 14/663,923.
Jun. 20, 2016—U.S. Final Office Action—U.S. Appl. No. 13/957,490.
Jun. 22, 2016—U.S. Notice of Allowance—U.S. Appl. No. 14/706,368.
Mar. 1, 2016—(JP) Notice of Reasons for Rejection—App 2012-193091—Eng Tran.
Mar. 8, 2016—(JP) Notification of Reasons for Rejection—App 2012-173269.
May 3, 2016—(CN) Office Action—App 201310084346.X—Eng Tran.
May 6, 2016—U.S. Non-Final Office Action—U.S. Appl. No. 13/957,479.
May 6, 2016—U.S. Non-Final Office Action—U.S. Appl. No. 14/208,220.
May 11, 2016—U.S. Notice of Allowance—U.S. Appl. No. 14/706,368.
May 17, 2016—(JP) Notification of Reasons for Rejection—App 2012-082818—Eng Trans.
Nov. 2, 2016—U.S. Non-Final Office Action—U.S. Appl. No. 14/669,553.
Nov. 3, 2016—U.S. Non-Final Office Action—U.S. Appl. No. 15/162,995.
Nov. 18, 2016—U.S. Notice of Allowance—U.S. Appl. No. 14/208,220.
Nov. 25, 2016—(CN) Office Action—App 201310084346.X—Eng Tran.
Sep. 6, 2016—U.S. Non-Final Office Action—U.S. Appl. No. 15/132,432.
Apr. 21, 2017—U.S. Final Office Action—U.S. Appl. No. 14/498,213.
Feb. 7, 2017—(JP) Notification of Reasons for Rejection—App 2013-204535—Eng Trans.
Jul. 7, 2017—U.S. Notice of Allowance—U.S. Appl. No. 14/706,368.
Jul. 18, 2017—(JP) Notification of Rejection—App 2016-156230—Eng Tran.
Jun. 1, 2017—U.S. Notice of Allowance—U.S. Appl. No. 15/283,829.
Jun. 1, 2017—U.S. Notice of Allowance—U.S. Appl. No. 13/834,434.
Mar. 1, 2017—U.S. Notice of Allowance—U.S. Appl. No. 15/162,995.
Mar. 23, 2017—U.S. Final Office Action—U.S. Appl. No. 14/669,553.
Mar. 29, 2017—U.S. Notice of Allowance—U.S. Appl. No. 15/283,829.
Mar. 3, 2017—U.S. Notice of Allowance—U.S. Appl. No. 15/132,432.
May 4, 2017—U.S. Non-Final Office Action—U.S. Appl. No. 15/287,054.
May 4, 2017—U.S. Office Action—U.S. Appl. No. 15/287,054.
May 16, 2017—U.S. Notice of Allowance—U.S. Appl. No. 14/706,368.
Anonymous,:"Near Field Communication White Paper", Feb. 12, 2004, URL:http://www.ecma-international.org/activities/Communications/2004tg19-001.pdf [retrieved on Mar. 6, 2006].
Co-pending U.S. Appl. No. 13/833,236, filed Mar. 15, 2013.
Information Technology—Telecommunications and information exchange between systems—Near Field Communication—Interface and Protocol (NFCIP-1), ISO/IEC 18092, Second edition, Mar. 15, 2013.
Information Technology—Telecommunications and information exchange between systems—Near Field Communication Interface and Protocol-2 (NFCIP-2), ISO/IEC 21481, Second edition, Jul. 1, 2012.
Nosowitz, D., "Everything You Need to Know about Near Field Communication," Popular Science, posted Mar. 1, 2011.
Requirement for Election issued in U.S. Appl. No. 13/834,423, dated Feb. 24, 2014.
Smart Cards; UICC-CLF interface; Host Controller Interface P2P LNC Protocol, Vo. 1.0, Jan. 11, 2008, pp. 1-33.
U.S. Appl. No. 61/601,496, filed Feb. 21, 2012, Drawings.
U.S. Appl. No. 61/601,496, filed Feb. 21, 2012, Specification.
Wi-Fi Peer-to-Peer (P2P) Technical Specification Version 1.1 2010, pp. 1-159.
Aug. 2, 2017—(EP) Office Action—App 13174778.4.
Jul. 27, 2017—(EP) Office Action—App 13161732.6.
Aug. 15, 2017—U.S. Non-Final Office Action—U.S. Appl. No. 14/498,213.
Sep. 27, 2017—U.S. Notice of Allowance—U.S. Appl. No. 15/617,354.
Oct. 17, 2017—U.S. Non-final Office Action—U.S. Appl. No. 15/691,214.
Nov. 24, 2017—U.S. Notice of Allowance—U.S. Appl. No. 14/669,553.
Jan. 17, 2018 U.S. Non-Final Office Action—U.S. Appl. No. 15/609,339.
Mar. 6, 2018—(JP) Notification of Rejection—App 2017-000214—Eng Tran.
Mar. 20, 2018—(JP) Notification of Rejection—App 2014-113107—Eng Tran.
Mar. 30, 2018—U.S. Non-Final Office Action—U.S. Appl. No. 15/584,056.
Apr. 16, 2020—U.S. Notice of Allowance—U.S. Appl. No. 16/299,640.
May 14, 2020—U.S. Non-final Office Action—U.S. Appl. No. 16/274,472.
Apr. 13, 2020—(CN) The Second Office Action—App 201510279268.8, Eng Tran.
Nov. 25, 2020—U.S. Non-Final Office Action—U.S. Appl. No. 16/720,120.

* cited by examiner

Fig. 1
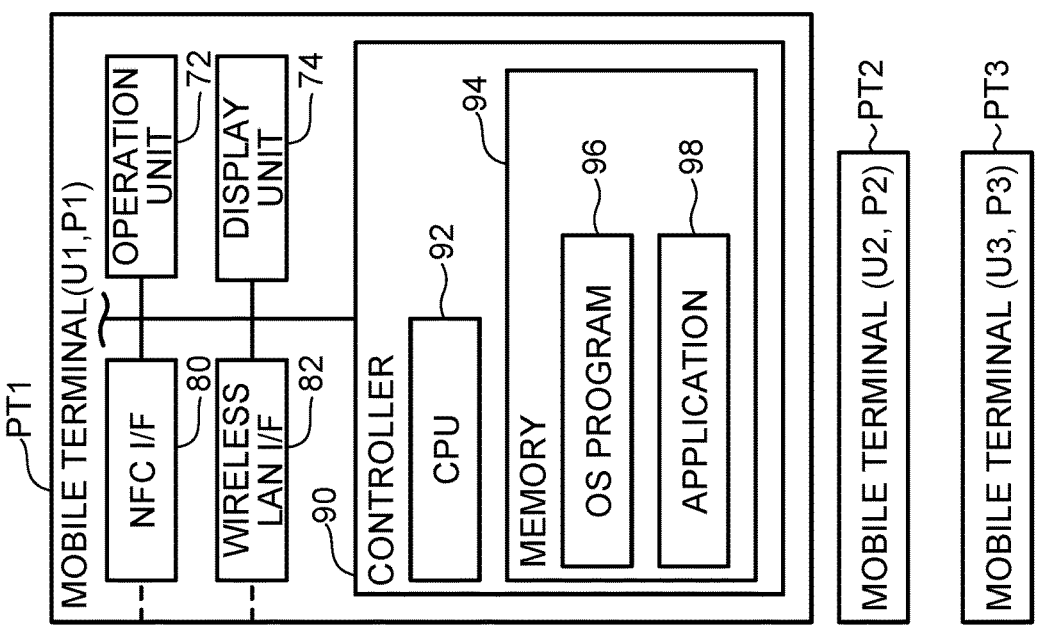
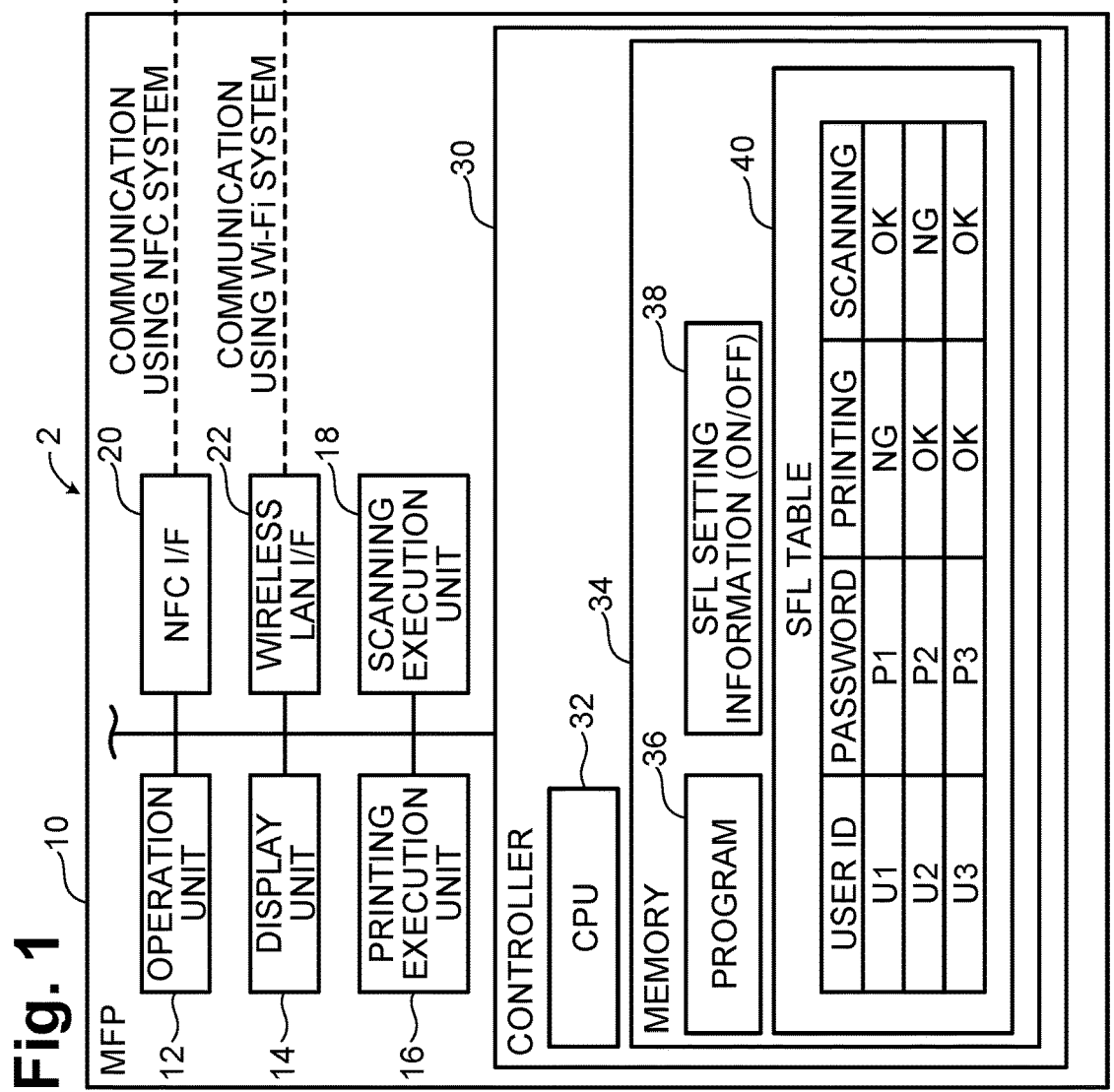

(FIRST ILLUSTRATIVE EMBODIMENT; CASE A1)
(SFL SETTING INFORMATION = ON)

(FIRST ILLUSTRATIVE EMBODIMENT; CASE A2)
(SFL SETTING INFORMATION = OFF)

(THIRD ILLUSTRATIVE EMBODIMENT; CASE C1)
(SFL SETTING INFORMATION = ON)

Fig. 10

(THIRD ILLUSTRATIVE EMBODIMENT; CASE C1)

| SFL TABLE | | | | |
|---|---|---|---|---|
| USER ID | PASSWORD | PRINTING | SCANNING | H/O |
| U1 | P1 | NG | OK | NG |
| U2 | P2 | OK | NG | NG |
| U3 | P3 | OK | OK | NG |

Fig. 12

(THIRD ILLUSTRATIVE EMBODIMENT; CASE C2)

| SFL TABLE | | | | |
|---|---|---|---|---|
| USER ID | PASSWORD | PRINTING | SCANNING | H/O |
| U1 | P1 | NG | OK | NG |
| U2 | P2 | NG | OK | OK |
| U3 | P3 | OK | OK | OK |

COMMUNICATION DEVICE AND TERMINAL DEVICE

CROSS-REFERENCE TO RELATED APPLICATION

This application is a divisional of prior U.S. application Ser. No. 16/130,755, filed Sep. 13, 2018, which is a divisional of prior U.S. application Ser. No. 14/498,213, filed Sep. 26, 2014, now U.S. Pat. No. 10,142,014, issued Nov. 27, 2018, which claims priority from Japanese Patent Application No. 2013-204535, filed on Sep. 30, 2013, the content of which are incorporated herein by reference in its entirety.

TECHNICAL FIELD

Aspects disclosed herein relate to a technique used in a communication device that is capable of communicating with a terminal device.

BACKGROUND

A known information processing device performs communication with a communication terminal using a Near Field Communication ("NFC") wireless communication protocol. The information processing device changes an operating mode of an NFC-enabled device, which is connected to the information processing device, to appropriate one of a passive tag mode and a Peer-to-Peer ("P2P") mode, to perform communication using the NFC wireless communication protocol with the communication terminal.

SUMMARY

In the technique used in the known information processing device, consideration might not be given to providing another interface that is different from an interface for communication using the NFC wireless communication protocol.

Accordingly, aspects of the disclosure provide for a technique that may enable selective performance of communication using appropriate one of a first interface and a second interface that is different from the first interface.

According to one or more aspects of the disclosure, the communication device may determine whether the communication device performs wireless communication of target data with the terminal device using the particular wireless network via the second interface depending on whether it is determined, in the first determination process, that the particular authentication information is listed on the list used for authentication. Therefore, according to the communication device, communication using appropriate one of the first interface and the second interface that may be different from the first interface may be performed selectively.

According to one or more aspects of the disclosure, the terminal device may perform wireless communication of target data with the communication device using the particular wireless network via the second interface depending on whether it is determined, by the terminal device, that the particular authentication information is listed on the list used for authentication. Therefore, according to the terminal device, communication using appropriate one of the first interface and the second interface that may be different from the first interface may be performed selectively.

According to one or more aspects of the disclosure, a system and method for providing network information using a short-range wireless communication path between a communication device and a terminal device is described. In some examples, authentication information is required from the terminal device prior to communication of the network information. In some examples, the short-range wireless communication path is disconnected and reestablished in which one of the terminal device and the communication device changes operation modes of a short-range wireless interface.

In one aspect, a communication device including a short-range wireless interface, a Wi-Fi interface, and instructions that control the communication device to receive, over a short-range wireless connection via the short-range wireless interface, request information from the terminal device, transmit, via the short-range wireless interface, first response information to the terminal device, receive, via the short-range wireless interface in the other mode, authentication information from the terminal device, execute, a first determination process in which the communication device determines whether the terminal device is authenticated, perform, via the short-range wireless interface in the other mode, communication of network information to be used to connect with the Wi-Fi interface, and perform wireless communication with the terminal device using the Wi-Fi interface.

In another aspect, a terminal device may include a short-range wireless interface, a Wi-Fi interface, and instructions that control the terminal device to transmit, over a short-range wireless connection via the short-range wireless interface, request information to the communication device, receive, via the short-range wireless interface, first response information from the communication device, transmit, via the short-range wireless interface in the other mode, authentication information to the communication device, perform, via the short-range wireless interface, communication of network information to be used to connect with the Wi-Fi interface, and perform wireless communication with the communication device using the Wi-Fi interface.

In a further aspect, the communication device may include a short-range wireless interface, a Wi-Fi interface, and instructions that control the communication device to receive, over a short-range wireless connection via the short-range wireless interface, request information from the terminal device, transmit, via the short-range wireless interface, first response information to the terminal device, receive, via the short-range wireless interface, authentication information from the terminal device, transmit the received authentication information to another device, receive confirmation from the another device that the terminal device is authorized, perform, via the short-range wireless interface, communication of network information to be used to connect with the Wi-Fi interface, and perform wireless communication with the terminal device using the Wi-Fi interface.

Control methods and computer programs for implementing the above-described communication device, and computer-readable storage media storing the computer programs may have novelty and utility. Control methods and computer programs for implementing the above-described terminal device, and computer-readable storage media storing the computer programs may also have novelty and utility.

Communication systems including the above-described communication device and at least one of a plurality of terminal devices may also have novelty and utility.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 1 illustrates an example configuration of a communication system in a first illustrative embodiment according to one or more aspects of the disclosure.

FIG. 10 illustrates an example SFL table used in Case C1 in the third illustrative embodiment according to one or more aspects of the disclosure.

FIG. 12 illustrates an example SFL table used in Case C2 in the third illustrative embodiment according to one or more aspects of the disclosure.

DETAILED DESCRIPTION

Figure 2:
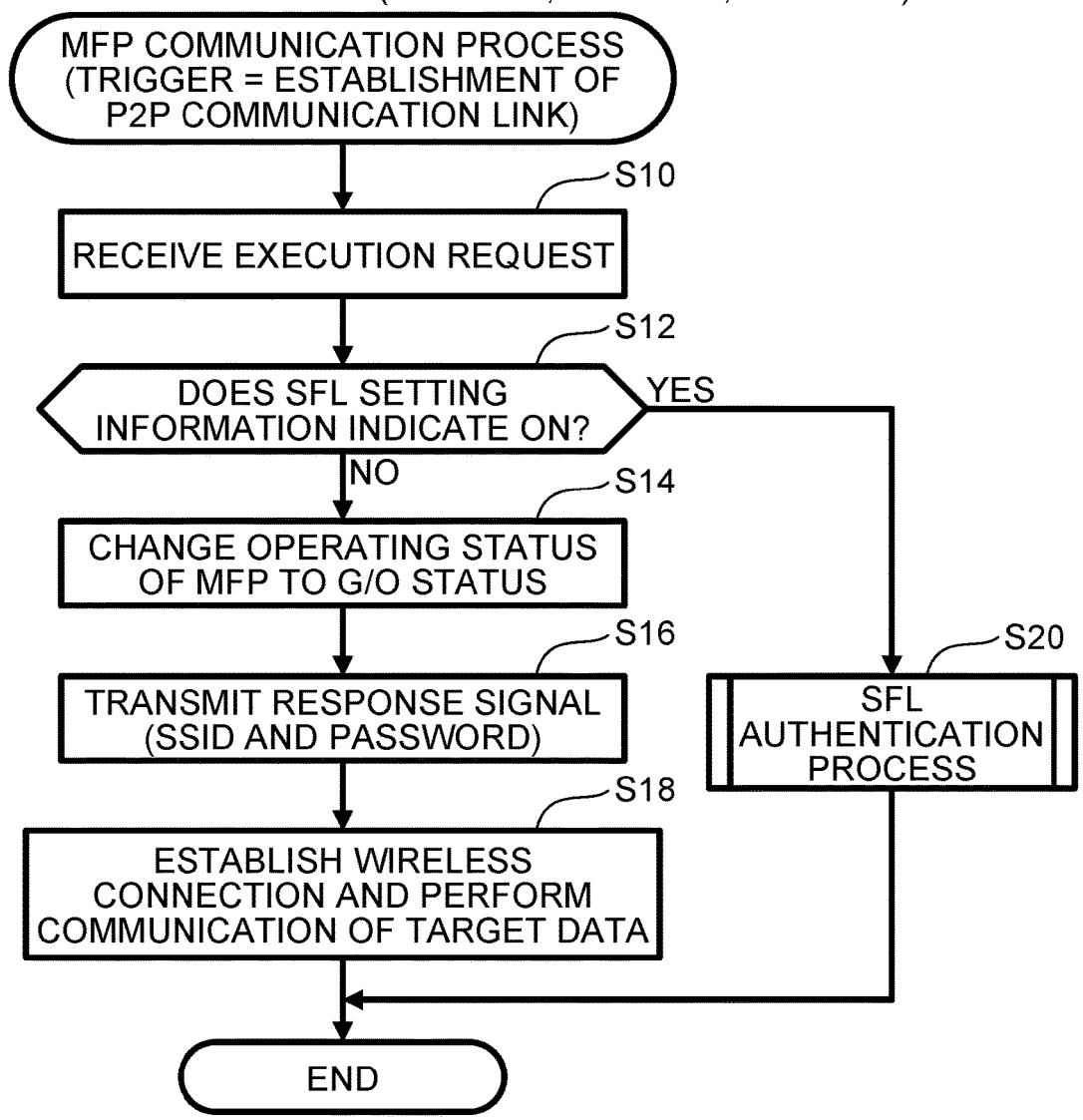
FIG. 2 is a flowchart depicting an example communication process executed in a multifunction peripheral ("MFP") in the first illustrative embodiment according to one or more aspects of the disclosure.

Hereinafter, illustrative embodiments will be described with reference to the accompanying drawings. Referring to FIG. 1, an example configuration of a communication system 2 according to a first illustrative embodiment will be described. As depicted in FIG. 1, the communication system 2 includes a multifunction peripheral ("MFP") 10 and mobile terminals PT1, PT2, and PT3. Each of the MFP 10 and the mobile terminals PT1, PT2, and PT3 is configured to perform wireless communication using a communication protocol that complies with a Near Field Communication ("NFC") standard (i.e., an NFC wireless communication protocol). Each of the MFP 10 and the mobile terminals PT1, PT2, and PT3 is configured to also perform wireless communication using another communication protocol that complies with a Wireless Fidelity ("Wi-Fi®") system created by the Wi-Fi Alliance (Wi-Fi® is a registered certification mark owned by the Wi-Fi Alliance of Austin, Tex.).

Referring to FIG. 1, an example configuration of the MFP 10 will be described. The MFP 10 is a peripheral device (e.g., a personal-computer ("PC") peripheral device) that is capable of performing multiple functions, for example, a printing function and a scanning function. The MFP 10 includes an operation unit 12, a display unit 14, a printing execution unit 16, a scanning execution unit 18, an NFC interface ("I/F") 20, a wireless local area network ("LAN") interface ("I/F") 22, and a controller 30, each of which are connected with a bus (reference numeral is omitted).

The operation unit 12 includes a plurality of keys. A user is allowed to input various instructions into the MFP 10 by operating the operation unit 12. The display unit 14 includes a display that is configured to display various information thereon. The printing execution unit 16 includes a printing mechanism using one of an inkjet method and a laser method. The scanning execution unit 18 includes a scanning mechanism using one of a charge-coupled device ("CCD") and a contact image sensor ("CIS").

The NFC I/F 20 is configured to allow the controller 30 to perform wireless communication using the NFC wireless communication protocol. In this illustrative embodiment, the NFC wireless communication protocol may be a wireless communication method for performing wireless communication in compliance with the International standard, e.g., ISO/IEC 21481 or ISO/IEC 18092.

The wireless LAN I/F 22 is configured to allow the controller 30 to perform wireless communication using the Wi-Fi® wireless communication protocol. In this illustrative embodiment, the Wi-Fi® wireless communication protocol may be a wireless communication method for performing wireless communication in compliance with the standard IEEE (The Institute of Electrical and Electronics Engineers, Inc.) 802.11 and its family standards (e.g., 802.11a, 802.11b, 802.11g, and 802.11n). The controller 30 is capable of performing communication using the Wi-Fi® wireless communication protocol via the wireless LAN I/F 22. More specifically, the controller 30 is capable of performing communication using the Wi-Fi® wireless communication protocol via the wireless LAN I/F 22 through the use of a wireless network using Wi-Fi Direct™ ("WFD") (Wi-Fi Direct™ is a certification mark owned by the Wi-Fi Alliance of Austin, Tex.) (hereinafter, a wireless network using Wi-Fi Direct™ is referred to as "WFDNW").

Dissimilarities between the NFC I/F 20 and the wireless LAN I/F 22 will be described below. A communication speed (e.g., a maximum communication speed is 11 to 600 Mbps) of wireless communication via the wireless LAN I/F 22 may be faster than a communication speed (e.g., a maximum communication speed is 100 to 424 kbps) of wireless communication using the NFC I/F 20. A frequency (e.g., 2.4 GHz band or 5.0 GHz band) of a carrier in wireless communication using the wireless LAN I/F 22 may also differ from a frequency (e.g., 13.56 MHz band) of a carrier in wireless communication using the NFC I/F 20. The controller 30 is allowed to perform wireless communication using the NFC wireless communication protocol between the MFP 10 and an external device (e.g., the mobile terminal PT1) via the NFC I/F 20 in a situation where a distance between the MFP 10 and the external device is shorter than or equal to approximately 10 cm. The controller 30 is allowed to perform wireless communication between the MFP 10 and the external device via the wireless LAN I/F 22, in a situation where the distance between the MFP 10 and the external device is longer than, shorter than or equal to approximately 10 cm (e.g., a maximum communicable distance is approximately 100 m). That is, a maximum distance that the MFP 10 can communicate with the external device wirelessly via the wireless LAN I/F 22 is longer than a maximum distance that the MFP 10 can communicate with the external device wirelessly via the NFC I/F 20.

The controller 30 includes a central processing unit ("CPU") 32 and a memory 34. The CPU 32 includes a processor that executes various processes in accordance with a program 36 (e.g., instructions) stored in the memory 34. The memory 34 further stores therein Secure Function Lock ("SFL") setting information 38 and an SFL table 40. The SFL setting information 38 indicates one of "ON" and "OFF" that is designated by the user. When the CPU 32 receives an execution request from another device via the NFC I/F 20 in a state where the SFL setting information 38 indicates "ON", the CPU 32 receives SFL authentication information (e.g., a user ID and a password) from the another device and determines whether the received SFL authentication information is listed on the SFL table 40 (i.e., The authentication information is correct). When the CPU 32 receives an execution request from the another device via the NFC I/F 20 in a state where the SFL setting information 38 indicates "OFF", the CPU 32 does not execute authentication. Hereinafter, the state where the SFL setting information 38 indicates "ON" is also referred as to "the SFL is "ON"" and the state where the SFL setting information 38 indicates "OFF" is also referred to as "the SFL is "OFF"".

The SFL table 40 includes a plurality pieces of combined information, each of which include, for example, a user ID (e.g., "U1"), a password (e.g., "P1"), availability information for printing function (e.g., "OK" or "NG"), and availability information for scanning function (e.g., "OK" or "NG") which are associated with each other. As used herein, "NG" is intended to mean "not good" or "no go" as known in the art. The plurality pieces of combined information are provided for a plurality of mobile terminals (e.g., the mobile terminals PT1, PT2, and PT3), respectively. In each combined information, the user ID identifies a user of a mobile terminal. The password is associated with the user ID. The availability information for printing function indicates whether the printing function is available to the user. The availability information for scanning function indicates whether the scanning function is available to the user. In the SFL table 40, "OK" indicates that a particular function is available to a particular user and "NG" indicates that a particular function is not available to a particular user. The SFL table 40 is prestored in the memory 34 by a person responsible for maintain the MFP 10. For example, the SFL table 40 depicted in FIG. 1 includes combined information in which "USER ID=U1", "PASSWORD=P1", "PRINTING=NG", and "SCANNING=OK" are associated with each other.

The memory 34 further includes a network storage area. The network storage area stores information relating to a WFDNW configured by the MFP 10. The MFP 10 is configured to serve as a master in the WFDNW (i.e., as a Group Owner in the WFD wireless communication protocol). That is, the MFP 10 is capable of configuring a WFDNW in which the MFP 10 itself serves as a master.

That is, the network storage area stores a wireless profile to be used in the WFDNW configured by the MFP 10 and a management list. The wireless profile includes a service set identifier ("SSID"), an authentication method, an encryption method, and a password. The management list may store therein one or more media access control ("MAC") addresses of one or more devices serving as a slave in the WFDNW. That is, the management list is configured to store therein one or more MAC addresses of one or more devices, each of which establishes wireless connection with the MFP 10 that serves as a master in the WFDNW.

Next, configurations of the mobile terminals PT1, PT2, and PT3 will be further described with reference to FIG. 1. The mobile terminals PT1, PT2, and PT3 each may include a portable terminal device such as a mobile phone (e.g., smartphone), a personal digital assistant ("PDA"), a notebook PC, a tablet PC, a mobile music player, and/or a mobile video player.

Hereinafter, an example configuration of the mobile terminal PT1 will be described. The mobile terminals PT2 and PT3 may have the same configuration as the mobile terminal PT1. The mobile terminal PT1 includes an operation unit 72, a display unit 74, an NFC I/F 80, a wireless LAN I/F 82, and a controller 90, each of which are connected with a bus (reference numeral is omitted).

The operation unit 72 includes a plurality of keys. The user is allowed to input various instructions into the mobile terminal PT1 by operating the operation unit 72. The display unit 74 includes a display that is configured to display various information thereon. The NFC I/F 80 and the wireless LAN I/F 82 have the similar configuration as the NFC I/F 20 and the wireless LAN I/F 22, respectively, of the MFP 10. That is, the mobile terminal PT1 is configured to perform selectively both communication using the NFC wireless communication protocol and communication using the Wi-Fi® wireless communication protocol.

The controller 90 includes a CPU 92 and a memory 94. The CPU 92 includes a processor that executes various processes in accordance with a program 96 or an application 98 (e.g., instructions) stored in the memory 94.

The operation system ("OS") program 96 is a program designed to enable the mobile terminal PT1 to perform basic operations. The application 98 is a program designed to enable the MFP 10 to execute a particular function, e.g., the printing function or the scanning function. The application 98 is supplied by a vendor of the MFP 10, and may be installed on the mobile terminal PT1 from a server on the Internet or from a medium supplied with the MFP 10.

The memory 94 further stores therein a user ID (e.g., "U1") that identifies the user of the mobile terminal PT1 and a password (e.g., "P1") that is associated with the user ID. Hereinafter, a combination of the user ID and the password may also be referred to as "SFL authentication information". During initial setting of the installed application 98, the user of the mobile terminal PT1 enters the user ID (e.g., "U1") and password (e.g., "P1") obtained in advance by operating the operation unit 72. For example, the user may obtain the user ID and password prestored in the memory 34 of the MFP 10 by notification from the person responsible for maintaining the MFP 10. The CPU 92 stores the entered user ID and password (e.g., SFL authentication information) in the memory 94.

Likewise, a memory of the mobile terminal PT2 stores therein a user ID (e.g., "U2") and a password (e.g., "P2") of a user of the mobile terminal PT2, and a memory of the mobile terminal PT3 stores therein a user ID (e.g., "U3") and a password (e.g., "P3") of a user of the mobile terminal PT3.

Next, communication using the NFC wireless communication protocol will be further described. Hereinafter, a device that includes an NFC I/F and is capable of performing communication using the NFC wireless communication protocol (e.g., the MFP 10 and the mobile terminals PT1, PT2, and PT3) is referred to as an "NFC-enabled device".

Hereinafter, a Reader mode and a Writer mode are collectively referred to as an "R/W mode".

Among NFC-enabled devices, there is a device in which the NFC I/F is capable of operating selectively in accordance with one of all the three modes of a P2P mode, an R/W mode, and a Card Emulation (CE) mode, and another device in which the NFC I/F is capable of operating selectively in accordance with one of one or two of the three modes. In the illustrative embodiment, the NFC I/F 20 of the MFP 10 and each of the NFC I/Fs 80 of the mobile terminals PT1, PT2, and PT3 are capable of operating selectively in accordance with one of all the above-described three modes. Hereinafter, for example, a situation in which an NFC I/F of an NFC-enabled device operates in accordance with the P2P mode is also referred to as "an NFC-enabled device operates in the P2P mode" or "the P2P mode is active in an NFC-enabled device".

The P2P mode provides two-way communication between NFC-enabled devices in a pair. It is assumed that the P2P mode is active in both of a first NFC-enabled device and a second NFC-enabled device. In this case, a communication link appropriate for the P2P mode (hereinafter, referred to as a "P2P communication link") is established between the first NFC-enabled device and the second NFC-enabled device. Under this situation, for example, the first NFC-enabled device transmits first predetermined data to the second NFC-enabled device via the P2P communication link. Then, the second NFC-enabled device transmits second predetermined data to the first NFC-enabled device via the same P2P communication link. Thus, two-way communication is implemented. An NFC-enabled device that is compliant with ISO/IEC 1443 Type A defined by the NFC Forum and an NFC-enabled device that is compliant with ISO/IEC 18092 Type F defined by the NFC Forum are both capable of using the P2P mode. Nevertheless, an NFC-enabled device that is compliant with ISO/IEC 1443 Type B defined by the NFC Forum is not capable of using the P2P mode.

The R/W mode and the CE mode both provide one-way communication between NFC-enabled devices in a pair. The CE mode enables an NFC-enabled device to operate as a "card" in a form defined by the NFC Forum. The NFC-enabled device of Type A, the NFC-enabled device of Type F, and the NFC-enabled device of Type B are capable of using the CE mode. The Reader mode enables an NFC-enabled device to read data from another NFC-enabled device that operates in the CE mode as a card. The Writer mode enables an NFC-enabled device to write data in another NFC-enabled device that operates in the CE mode as a card. The Reader mode also enables an NFC-enabled device to read data from an NFC-compliant card (e.g., the identification card 100). The Writer mode also enables an NFC-enabled device to write data in the NFC-compliant card.

For example, in one scenario, the Reader mode is active in the first NFC-enabled device and the CE mode is active in the second NFC-enabled device. In this case, a communication link appropriate for the Reader mode and the CE mode is established between the first NFC-enabled device and the second NFC-enabled device. Under this situation, the first NFC-enabled device performs an operation for reading data from a pseudo card in the second NFC-enabled device via the communication link to receive the data from the second NFC-enabled device.

In another example, if the Writer mode is active in the first NFC-enabled device and the CE mode is active in the second NFC-enabled device, a communication link appropriate for the Writer mode and the CE mode is established between the first NFC-enabled device and the second NFC-enabled device. Under this situation, the first NFC-enabled device performs an operation for writing data into the pseudo card in the second NFC-enabled device via the communication link to transmit the data to the second NFC-enabled device.

As described above, various combinations of the modes are available to perform communication using the NFC wireless communication protocol between NFC-enabled devices in a pair. For example, for the combinations of the modes in the pair of NFC-enabled devices, the following five patterns are available: a "P2P mode and P2P mode" pair, a "Reader mode and CE mode" pair, a "Writer mode and CE mode" pair, a "CE mode and Reader mode" pair, and a "CE mode and Writer mode" pair.

Hereinafter, for example, a communication link established between the MFP 10 that operates in the R/W mode and the mobile terminal PT1 that operates in the CE mode is also referred to as an "MFP 10 (R/W)-mobile terminal PT1 (CE) communication link".

The NFC-enabled devices are configured to establish therebetween a communication link appropriate for an active mode but not configured to establish therebetween a communication link appropriate for an inactive mode. For example, when the CE mode is active and the P2P mode and the R/W mode are inactive in the MFP 10, the MFP 10 is allowed to establish a communication link for enabling the MFP 10 to operate in the CE mode. Nevertheless, the MFP 10 is not allowed to establish another communication link (e.g., a communication link for enabling the MFP 10 to operate in the inactive P2P mode, the inactive Reader mode, or the inactive Writer mode).

In the illustrative embodiment, as the power of the MFP 10 is turned on, the NFC I/F 20 changes its state to an initial state where the P2P mode and the R/W mode are active and the CE mode is inactive. While the power of the MFP 10 is on, the MFP 10 operates with the NFC I/F 20 having the initial state.

Next, the WFD will be described. The WFD is a standard created by the Wi-Fi Alliance and is specified in the "Wi-Fi Peer-to-Peer (P2P) Technical Specification Version 1.1" drafted by the Wi-Fi Alliance.

Hereinafter, a device that is capable of performing wireless communication in compliance with the WFD wireless communication protocol (e.g., the MFP 10) is referred to as a "WFD-enabled device". The WFD standard defines three statuses of the WFD-enabled device: a group owner ("G/O") status, a client ("CL") status, and a device status. The WFD-enabled device is configured to operate selectively in one of the three statuses.

A WFD-enabled device having the G/O status (hereinafter, also referred to as a "G/O-status device") is configured to configure a wireless network (e.g., a WFDNW) in which the WFD-enabled device serves as a master. A WFD-enabled device having the CL status (hereinafter, also referred to as a "CL-status device") serves as a slave in the WFDNW. A WFD-enabled device having the device status (hereinafter, also referred to as a "device-status device") does not belong in the WFDNW.

A situation in which both a G/O-status device and a CL-status device belong in the same WFDNW is established, for example, by one of the following procedures. Hereinafter, the situation in which both a G/O-status device and a CL-status device belong in the same WFDNW is also referred to as a "belonging situation". According to a first procedure, device-status devices in a pair execute a G/O negotiation which is wireless communication. Through the G/O negotiation, it is determined that one of the device-status devices changes its state to the G/O status (i.e., becomes a G/O-status device) and the other changes its state to the CL status (i.e., becomes a CL-status device). Then, the device serving as the G/O-status device configures a WFDNW to establish wireless connection with the device serving as the CL-status device. Thus, the situation in which both the G/O-status device and the CL-status device belong in the same WFDNW (e.g., the belonging situation) is established.

According to a second procedure, one of device-status devices in a pair changes to the G/O status voluntarily to configure a WFDNW without performing a G/O negotiation with the other of the device-status devices. In this case, after one of the device-status devices becomes a G/O-status device and configure the WFDNW, the other of the device-status devices changes to the CL status without performing a G/O negotiation with the G/O-status device and establishes wireless connection with the G/O-status device. Thus, the situation in which both the G/O-status device and the CL-status device belong in the same WFDNW (e.g., the belonging situation) is established. In the illustrative embodiment, under a predetermined situation (e.g., NO in step S12 in FIG. 2 or YES in step S38 in FIG. 3), the MFP 10 changes to the G/O status voluntarily to configure a WFDNW without performing a G/O negotiation (e.g., step S14 in FIG. 2 or step S40 in FIG. 3) in accordance with the second procedure.

The G/O-status device does not require any relay device for performing wireless communication of target data with the CL-status device. The target data includes information on a network layer of an Open System Interconnection ("OSI") reference model, and information on a layer (e.g., the application layer) higher than the network layer in the OSI reference model. The target data may include, for example, print data representing an image of a print target. The G/O-status device is also configured to relay wireless communication between CL-status devices in a pair that transmit target data therebetween. As described above, the devices belonging in the same WFDNW are capable of performing wireless communication of target data therebetween by bypassing an access point ("AP") that is provided separately from the devices. That is, the WFD wireless communication protocol is a system for wireless communication not using the AP.

The G/O-status device is configured to not perform wireless communication of target data with a device-status device that does not belong in the WFDNW in which the G/O-status device belongs. Nevertheless, the G/O-status device is configured to establish wireless connection with the device-status device by performing wireless communication of data for establishing connection, with the device-status device. With the establishment of the wireless connection therebetween, the G/O-status device permits the device-status device to participate in the WFDNW.

The G/O-status device is further configured to establish wireless connection with a legacy device that does not belong in the WFDNW in which the G/O-status device belongs by performing wireless communication of data for establishing connection, with the legacy device. With the establishment of the wireless connection therebetween, the G/O-status device permits the legacy device to participate in the WFDNW. The legacy device does not support the WFD system but is configured to establish wireless connection with, for example, an AP, using the Wi-Fi® system. In the illustrative embodiment, the mobile terminals PT1, PT2, and PT3 may be legacy devices.

The data for establishing connection includes information on a lower layer (e.g., a physical layer or a data link layer) underlying the network layer in the OSI reference model, that is, the data for establishing connection does not include information on the network layer. More specifically, there are two types of data for establishing connection: data for establishing WFD connection that includes specific data that is specific to the WFD system and data for establishing normal connection that does not include such specific data.

The data for establishing normal connection includes, for example, a Probe Request/Response, an Authentication Request/Response, an Association Request/Response, data for a Wi-Fi Simple Configuration ("WSC") Exchange, and data for a four-way handshake. The Probe Request is a signal for searching a device serving as a master in a wireless network (e.g., a G/O-status device or an AP). The Probe Response is a response signal in response to the Probe Request. The Authentication Request is a signal for confirming an authentication method. The Authentication Response is a response signal in response to the Authentication Request. The Association Request is a signal for requesting establishment of connection. The Association Response is a response signal in response to the Association Request. The data for the WSC Exchange is a signal for providing various information, e.g., a password. The data for the four-way handshake is a signal for executing authentication.

In addition to the data for establishing normal connection, the data for establishing WFD connection further includes, for example, an Invitation Request/Response and a Provision Discovery Request/Response that are the specific data that is specific to the WFD system. The Invitation Request is a signal for requesting a device-status device to participate in a WFDNW. The Invitation Response is a response signal in response to the Invitation Request. The Provision Discovery Request is signal for confirming a method (e.g., one of a Push-Button Method and a PIN Method) of Wi-Fi Protected Setup™ ("WPS") (Wi-Fi Protected Setup™ is a trademark owned by the Wi-Fi Alliance of Austin, Tex.). The Provision Discovery Response is a response signal in response to the Provision Discovery Request.

Generally, the data for establishing normal connection is used for establishing wireless connection between a legacy device and an AP. That is, the legacy device performs, with the AP, wireless communication of data for establishing normal connection to establish wireless connection therebetween. By doing so, the legacy device is permitted to participate in a wireless network configured by the AP, as a station. Likewise, the legacy device performs, with a G/O-status device, wireless communication of data for establishing normal connection to establish wireless connection therebetween. By doing so, the legacy device is permitted to participate in the WFDNW in which the G/O-status device belongs, as a station.

A device-status device (i.e., a device that supports the WFD system) performs, with the G/O-status device, wireless communication of appropriate one of data for establishing normal connection and data for establishing WFD connection, according to the circumstances, to establish wireless connection therebetween. By doing so, the device-status device is permitted to participate in the WFDNW. In a case where the device-status device performs wireless communication of data for establishing normal connection, the device-status device participates in the WFDNW, as a station, because the device-status device does not perform wireless communication of specific data that is specific to the WFD system. In a case where the device-status device performs wireless communication of data for establishing WFD connection, the device-status device participates in the WFDNW, as a CL-status device.

As described above, the device-status device may participate in the WFDNW, as one of a station and as a CL-status device. Hereinafter, both the station and the CL-status device are referred to as a "slave".

Referring to FIG. 2, a detail of a communication process executed by the CPU 32 of the MFP 10 will be further described. As described above, in the first illustrative embodiment, as the power of the MFP 10 is turned on, the NFC I/F 20 operates in the state where the P2P mode and the R/W mode are active and the CE mode is inactive. The communication process of FIG. 2 starts upon establishment of a P2P communication link between the MFP 10 and a mobile terminal (e.g., the mobile terminal PT1). Hereinafter, the mobile terminal that establishes the P2P communication link with the MFP 10 is referred to as a "target terminal". At the time of starting the communication process of FIG. 2, the MFP 10 serves as a device-status device that does not belong in any WFDNW.

When a user of a target terminal requests the MFP 10 to execute a particular function, e.g., the printing function, the user performs an operation for starting the application 98 for the MFP 10 (see FIG. 1) and an operation for instructing execution of the particular function, on the target terminal. In response to the execution of the above operations, an NFC I/F of the target terminal (e.g., the NFC I/F 80 of the mobile terminal PT1) starts operating in a state where the P2P mode is active (e.g., "ON") and the R/W mode and the CE mode are inactive (e.g., "OFF"). Then, the user brings the target terminal closer to the MFP 10. As a distance between the NFC I/F of the target terminal and the NFC I/F 20 of the MFP 10 becomes a certain distance or shorter in which communication using the NFC system can be performed therebetween (e.g., approximately 10 cm), a P2P communication link is established between the NFC I/F of the target terminal and the NFC I/F 20 of the MFP 10. In this case, the target terminal transmits, to the MFP 10, an execution request for execution of the particular function using the P2P communication link. The execution request includes information indicating the particular function that is requested to be executed but not include the user ID of the target terminal.

When the P2P communication link is established between the target terminal and the MFP 10, the CPU 32 of the MFP 10 starts the communication process of FIG. 2. In step S10, the CPU 32 receives an execution request from the target terminal using the P2P communication link (e.g., via the NFC I/F 20).

In step S12, the CPU 32 determines whether the SFL setting information 38 indicates "ON" with reference to the SFL setting information 38 stored in the memory 34. When the CPU 32 determines that the SFL setting information 38 indicates "ON", the CPU 32 makes a positive determination (e.g., YES) in step S12, and the routine proceeds to step S20. In step S20, the CPU 32 executes an SFL authentication process (see FIG. 3). When the CPU 32 determines that the SFL setting information 38 indicates "OFF", the CPU 32 makes a negative determination (e.g., NO) in step S12, and the routine proceeds to step S14.

In step S14, the CPU 32 changes the operating status of the MFP 10 from the device status to the G/O status. Thus, the MFP 10 starts operating in the G/O-status device. That is, a WFDNW in which the MFP 10 serves as a master is configured. The CPU 32 prepares a wireless profile to be used in the WFDNW. More specifically, the CPU 32 generates a unique SSID. The CPU 32 further generates a password, for example, by selecting characters randomly. The CPU 32 further prepares a predetermined authentication method and encryption method. The CPU 32 stores the prepared wireless profile in the memory 34.

In step S16, the CPU 32 transmits a Response signal including the SSID and password generated in step S14 to the target terminal using the P2P communication link, thereby notifying the target terminal to establish wireless connection with the MFP 10 using the SSID and password included in the Response signal.

In step S18, the CPU 32 executes processing for establishing wireless connection in conjunction with the target terminal using the SSID and password generated in step S14, to establish wireless connection therebetween. More specifically, the CPU 32 receives a Probe Request from the target terminal and transmits a Probe Response to the target terminal in response to the Probe Request. The Probe Request includes the SSID that is provided to the target terminal in step S16 in FIG. 2. The Probe Response includes the authentication method and encryption method stored in the memory 34 in step S14 in FIG. 2. Through the transmission of the Probe Response, the CPU 32 notifies the target terminal to use the provided authentication method and encryption method. Subsequent to this, the CPU 32 receives an Authentication Request and an Association Request sequentially from the target terminal and transmits an Authentication Response and an Association Response sequentially to the target terminal in response to the Authentication Request and the Association Request, respectively. Then, the CPU 32 executes a four-way handshake with the target terminal.

Upon completion of the above processing, wireless connection is established between the MFP 10 and the target terminal. Thus, the CPU 32 permits the target terminal to participate in the WFDNW configured in step S14, as a slave (more specifically, as a station). The CPU 32 thus lists a MAC address of the target terminal in the management list, whereby a belonging situation in which both the MFP 10 and the target terminal belong in the same WFDNW is established.

Subsequent to the establishment of the belonging situation, the CPU 32 performs wireless communication of target data (e.g., print data) with the target terminal using the WFDNW via the wireless LAN I/F 22. Upon completion of the processing in step S18, the CPU 32 ends the communication process of FIG. 2. After the wireless communication of target data is performed therebetween, the CPU 32 determines whether the particular function requested by the user of the target terminal is available to the user with reference to the SFL table 40. When the CPU 32 determines that the particular function is available to the user, the CPU 32 executes the particular function.

Figure 3:
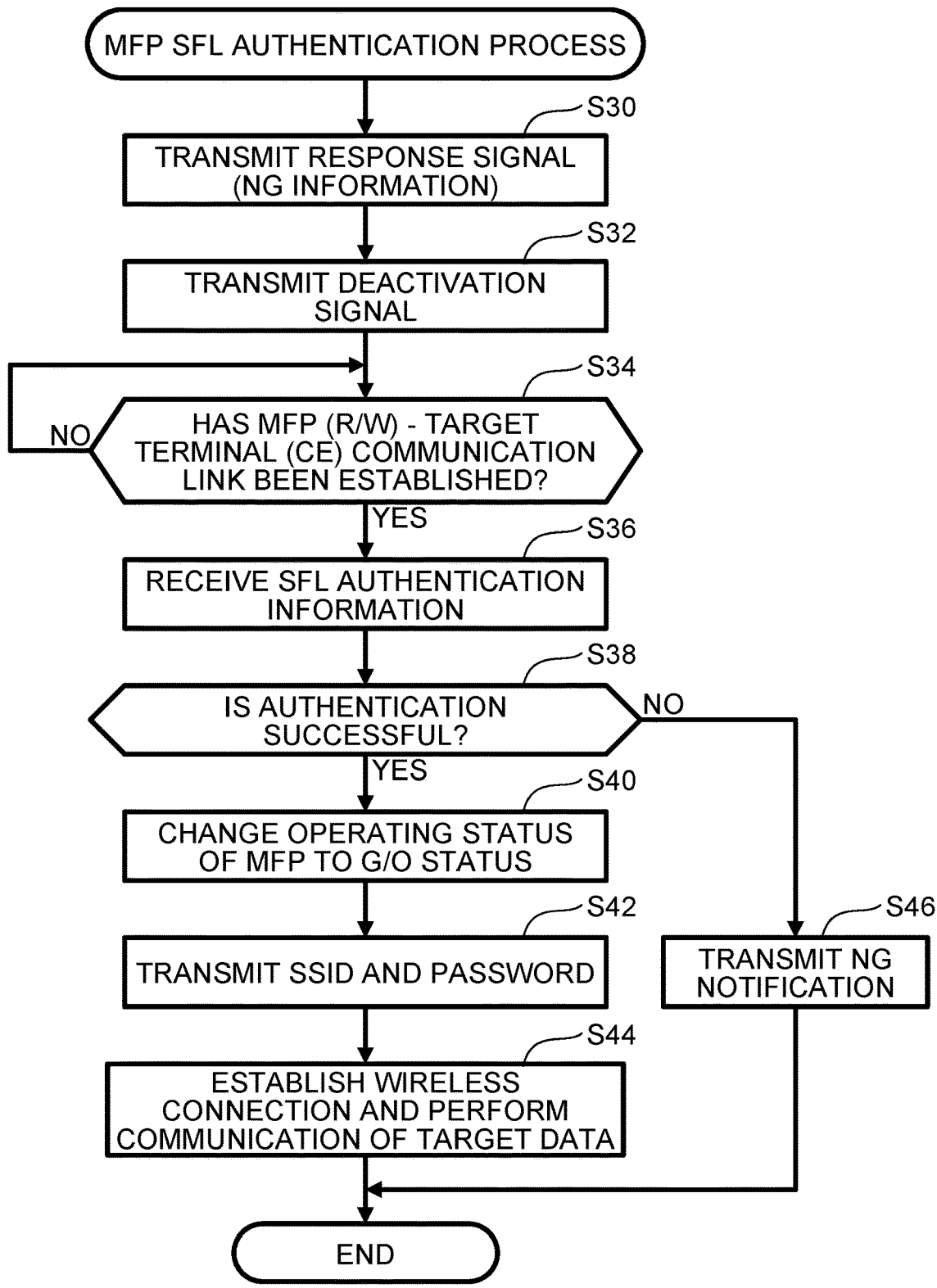
FIG. 3 is a flowchart depicting an example Secure Function Lock ("SFL") authentication process executed in the MFP in the first illustrative embodiment according to one or more aspects of the disclosure.

Referring to FIG. 3, a detail of the SFL authentication process executed in step S20 in FIG. 2 will be further described. In a case where the CPU 32 receives the execution request from the target terminal using the P2P communication link established between the MFP 10 and the target terminal (e.g., step S10 in FIG. 2), when the CPU 32 determines that the SFL setting information 38 indicates "ON" (e.g., YES in step S12 in FIG. 2), the CPU 32 starts the SFL authentication process of FIG. 3.

In step S30, the CPU 32 transmits a Response signal to the target terminal using the P2P communication link. The Response signal includes information indicating that the CPU 32 cannot execute user ID authentication (hereinafter, referred to as "NG information") because no user ID is included in the execution request received in step S10 in FIG. 2.

In step S32, the CPU 32 transmits a Deactivation signal to the target terminal using the P2P communication link. The Deactivation signal is a signal for requesting disconnection of the established P2P communication link.

In response to the Deactivation signal, the target terminal transmits an OK signal to the MFP 10 using the P2P communication link. Thus, the P2P communication link established between the MFP 10 and the target terminal is disconnected.

In step S34, the CPU 32 monitors establishment of an MFP 10 (R/W)-target terminal (CE) communication link.

Figure 4:
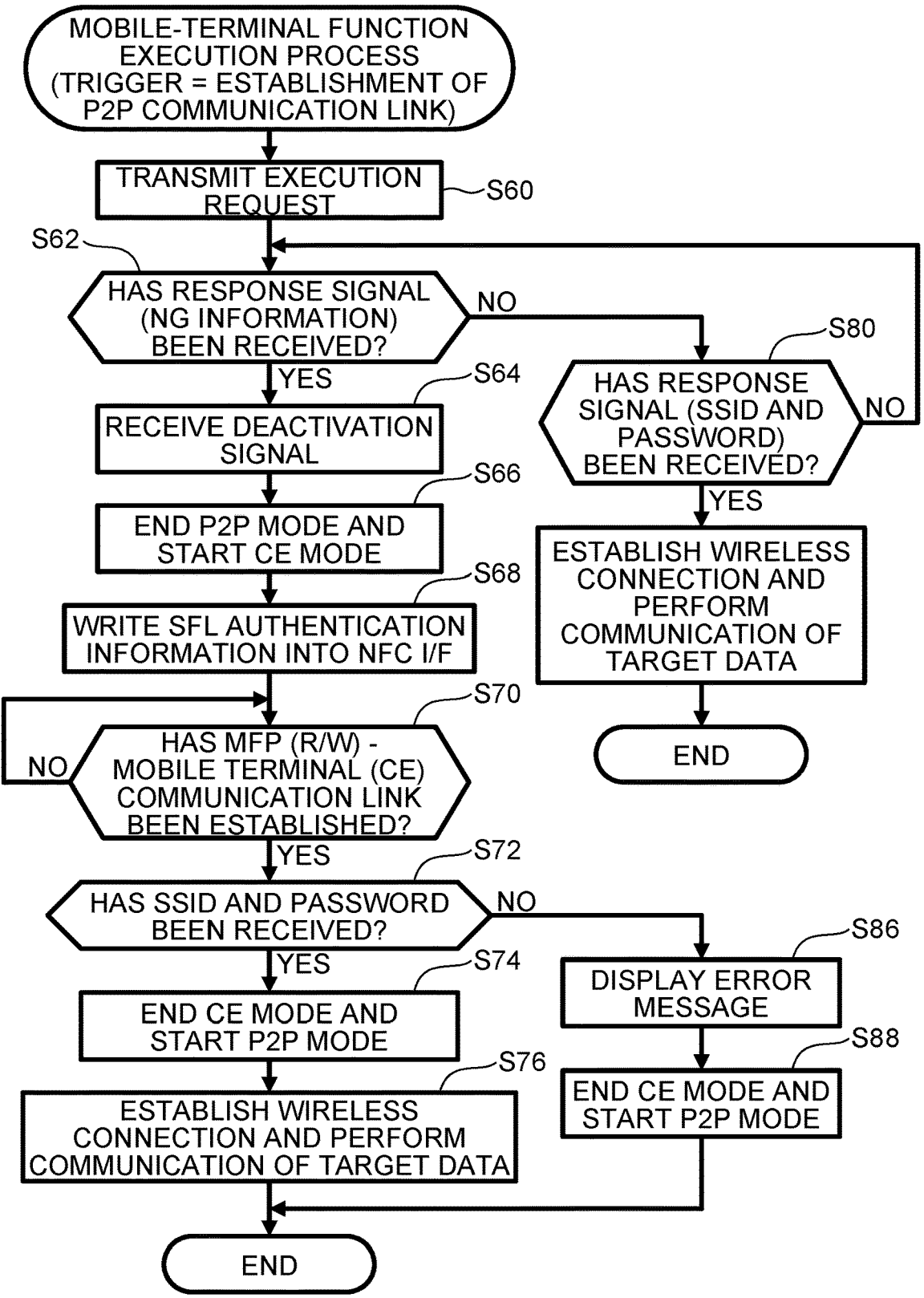
FIG. 4 is a flowchart depicting an example function execution process executed in a mobile terminal in the first illustrative embodiment according to one or more aspects of the disclosure.

As the P2P communication link is disconnected, the target terminal changes the state of the NFC I/F to a state in which the CE mode is active and the other modes are inactive from the state in which the P2P mode is active and the other modes are inactive (e.g., step S66 in FIG. 4). While the user of the target terminal holds the target terminal at a position within the range in which the target terminal can perform communication using the NFC system with the MFP 10 (e.g., within approximately 10 cm from the MFP 10), an MFP 10 (R/W)-target terminal (CE) communication link is established between the NFC I/F of the target terminal and the NFC I/F 20 of the MFP 10.

As the MFP 10 (R/W)-target terminal (CE) communication link is established, the CPU 32 makes a positive determination (e.g., YES) in step S34, and the routine proceeds to step S36. In step S36, the CPU 32 receives SFL authentication information (e.g., the user ID (e.g., "U1") and the password (e.g., "P1") of the user of the mobile terminal PT1) from the target terminal using the established R/W-CE communication link. More specifically, in step S36, the CPU 32 reads the SFL authentication information from the NFC I/F of the target terminal in which the SFL authentication information are written, using the established R/W-CE communication link, and obtains the read SFL authentication information via the NFC I/F 20.

In step S38, the CPU 32 executes authentication using the SFL authentication information obtained in step S36 and determines whether the authentication is successful. More specifically, in step S38, the CPU 32 determines whether the combined information including the SFL authentication information (e.g., the user ID and the password) obtained in step S36 is included in the SFL table 40 (see FIG. 1). When the CPU 32 determines that the combined information including the SFL authentication information (e.g., the user ID and the password) obtained in step S36 is included in the SFL table 40, the CPU 32 makes a positive determination (e.g., YES) in step S38 (e.g., the authentication is successful), and the routine proceeds to step S40. When the CPU 32 determines that the combined information including the SFL authentication information (e.g., the user ID and the password) obtained in step S36 is not included in the SFL table 40, the CPU 32 makes a negative determination (e.g., NO) in step S38 (e.g., the authentication is failed), and the routine proceeds to step S46. The processing of step S38 may be an example of the situation in which "the authentication information is correct".

In step S40, the CPU 32 changes the operating status of the MFP 10 from the device status to the G/O status. Thus, the MFP 10 starts serving as a G/O-status device. That is, a WFDNW in which the MFP 10 serves as a master is configured. Similar to the processing in step S14 in FIG. 2, the CPU 32 prepares a wireless profile to be used in the WFDNW (e.g., an SSID, a password, an authentication method, and an encryption method) and stores the prepared wireless profile in the memory 34.

In step S42, the CPU 32 transmits the SSID and password generated in step S40 to the target terminal using the MFP 10 (R/W)-target terminal (CE) communication link. More specifically, the CPU 32 writes the SSID and the password into the NFC I/F of the target terminal, thereby notifying the target terminal to establish wireless connection with the MFP 10 using the SSID and password written in the NFC I/F of the target terminal. The transmission of the SSID and the password in step S42 is executed in response to the execution request received in step S10 in FIG. 2. That is, in step S42, the CPU 32 transmits the SSID and the password to the target terminal without receiving again a request for transmission of the SSID and the password from the target terminal.

In step S44, the CPU 32 executes wireless processing for establishing wireless connection in conjunction with the target terminal using the SSID and password generated in step S14, to establish wireless connection therebetween. The processing for establishing wireless connection executed in step S44 may be substantially the same as the processing for establishing wireless connection executed in step S18 in FIG. 2 described above, and therefore, a detailed description of the processing for establishing wireless connection executed in step S44 will be omitted. Through the processing for establishing wireless connection, the CPU 32 permits the target terminal to participate in the WFDNW configured in step S40, as a slave (more specifically, as a station). The CPU 32 thus lists a MAC address of the target terminal in the management list. Accordingly, a belonging situation in which both the MFP 10 and the target terminal belong in the same WFDNW is established. Subsequent to the establishment of the belonging situation, the CPU 32 performs wireless communication of target data (e.g., print data) with the target terminal using the WFDNW via the wireless LAN I/F 22. Upon completion of the processing in step S44, the CPU 32 ends the SFL authentication process of FIG. 3 and the communication process of FIG. 2. As described above, subsequent to the performance of wireless communication of the target data between the MFP 10 and the target terminal, the CPU 32 determines whether the particular function requested by the user of the target terminal is available to the user with reference to the SFL table 40. When the CPU 32 determines that the particular function is available to the user, the CPU 32 executes the particular function.

In step S46, the CPU 32 transmits a predetermined NG notification to the target terminal using the MFP 10 (R/W)-target terminal (CE) communication link. The NG notification indicates that the authentication is failed. In this case, wireless connection is not established between the MFP 10 and the target terminal. Upon completion of the processing in step S46, the CPU 32 ends the SFL authentication process of FIG. 3 and the communication process of FIG. 2.

Upon receipt of one of the Response signal including the SSID and the password (e.g., step S42) and the NG notification (e.g., step S46), the NFC I/F of the target terminal returns to the state in which the P2P mode is active and the other modes are inactive from the state in which the CE mode is active and the other modes are inactive (e.g., step S74 or S88 in FIG. 4). Thus, the MFP 10 (R/W)-target terminal (CE) communication link is disconnected. That is, in the illustrative embodiment, the MFP 10 (R/W)-target terminal (CE) communication link is disconnected at a predetermined timing subsequent to step S42 or S46.

Referring to FIG. 4, a detail of a function execution process executed by the CPU 92 of the mobile terminal PT1 will be described. The mobile terminals PT2 and PT3 are also configured to execute the same function execution process as the mobile terminal PT1 executes.

When the user of the mobile terminal PT1 requests the MFP 10 to execute a particular function, e.g., the printing function, of the MFP 10, the user performs the operation for starting the application 98 (hereinafter, referred to as an "application startup operation") and then the operation for instructing execution of the particular function (hereinafter, referred to as an "execution instruction operation") by operating the operation unit 72 of the mobile terminal PT1. For example, when the execution instruction operation is a printing-execution instruction operation for instructing execution of printing, the execution instruction operation includes an operation for designating print data that represents a print target image from the memory 94 of the mobile terminal PT1.

Upon execution of the execution instruction operation, the NFC I/F 80 of the mobile terminal PT1 starts operating in a state where the P2P mode is active (e.g., "ON") and the R/W mode and the CE mode are inactive (e.g., "OFF"). Then, the user brings the mobile terminal PT1 closer to the MFP 10. As a distance between the NFC I/F 80 of the mobile terminal PT1 and the NFC I/F 20 of the MFP 10 becomes a certain distance or shorter in which communication using the NFC system can be performed therebetween (e.g., approximately 10 cm), a P2P communication link is established between the NFC I/F 80 of the mobile terminal PT1 and the NFC I/F 20 of the MFP 10. The function execution process of FIG. 4 starts upon establishment of a P2P communication link between the mobile terminal PT1 and the MFP 10.

In step S60, the CPU 92 transmits, to the MFP 10, using the established P2P communication link, an execution request for execution of the particular function requested to be executed through the execution instruction operation. The execution request includes information indicating the particular function that is requested to be executed but not include the user ID of the mobile terminal PT1.

In step S62, the CPU 92 monitors receipt of a Response signal including NG information (e.g., step S30 in FIG. 3) from the MFP 10 using the P2P communication link. In step S80, the CPU 92 monitors receipt of a Response signal including the SSID and the password (e.g., step S14 in FIG. 2) from the MFP 10 using the P2P communication link.

When the MFP 10 receives a Response signal including NG information, the CPU 92 makes a positive determination (e.g., YES) in step S62, and the routine proceeds to step S64.

When the MFP 10 receives a Response signal including the SSID and the password, the CPU 92 makes a positive determination (e.g., YES) in step S80, and the routine proceeds to step S82. In step S82, the CPU 92 executes processing for establishing wireless connection in conjunction with the MFP 10 using the received SSID and password, to establish wireless connection therebetween. The processing for establishing wireless connection executed in step S82 may be substantially the same as the processing for establishing wireless connection executed in step S18 in FIG. 2 described above. The processing executed in step S82 by the CPU 92 may be substantially the same as the processing executed in step S18 in FIG. 2 by the target terminal. Upon completion of the processing for establishing wireless connection, wireless connection is established between the mobile terminal PT1 and MFP 10. Thus, the mobile terminal PT1 is permitted to participate in the WFDNW in which the MFP 10 serves as a G/O-status device (e.g., the WFDNW configured in step S14 in FIG. 2), as a slave (more specifically, as a station), whereby a belonging situation in which both the MFP 10 and the target terminal belong in the same WFDNW is established. Subsequent to the establishment of the belonging situation, the CPU 92 performs wireless communication of target data (e.g., print data) with the target terminal using the WFDNW via wireless LAN I/F 82. Upon completion of the processing in step S82, the CPU 92 ends the function execution process of FIG. 4.

In step S64, the CPU 92 receives a Deactivation signal from the MFP 10 using the P2P communication link. In response to the Deactivation signal, the CPU 92 transmits an OK signal to the MFP 10 using the P2P communication link. Thus, the P2P communication link established between the MFP 10 and the mobile terminal PT1 is disconnected.

In step S66, the CPU 92 changes the state of the NFC I/F 80 from the state where the P2P mode is active (e.g., "ON") and the other modes are inactive (e.g., "OFF") to a state where the CE mode is active (e.g., "ON") and the other modes are inactive (e.g., "OFF"). More specifically, the CPU 92 ends the P2P mode and starts the CE mode. In step S68, the CPU 92 writes the SFL authentication information (e.g., the user ID (e.g., "U1") and the password (e.g., "P1")) into the NFC I/F 80.

In step S70, the CPU 92 monitors establishment of an MFP 10 (R/W)-mobile terminal PT1 (CE) communication link. While the user of the mobile terminal PT1 holds the mobile terminal PT1 at a position within the range in which the mobile terminal PT1 can perform communication using the NFC system with the MFP 10 (e.g., within approximately 10 cm from the MFP 10), an MFP 10 (R/W)-mobile terminal PT1 (CE) communication link is established between the NFC I/F 80 of the mobile terminal PT1 and the NFC I/F 20 of the MFP 10. As the MFP 10 (R/W)-mobile terminal PT1 (CE) communication link is established, the CPU 92 makes a positive determination (e.g., YES) in step S70, and the routine proceeds to step S72.

In step S72, the CPU 92 monitors receipt of an SSID and a password from the MFP 10 using the MFP 10 (R/W)-mobile terminal PT1 (CE) communication link.

As the MFP 10 (R/W)-mobile terminal PT1 (CE) communication link is established, the SFL authentication information written in the NFC I/F 80 is read therefrom by the MFP 10 using the established communication link. The MFP 10 obtains the read SFL authentication information (e.g., step S36 in FIG. 3). The MFP 10 then executes authentication using the read SFL authentication information (e.g., step S38 in FIG. 3). When the authentication is successful (e.g., YES in step S38 in FIG. 3), the MFP 10 starts serving as a G/O-status device and prepares a wireless profile (e.g., step S40 in FIG. 3). The MFP 10 transmits the SSID and the password to the mobile terminal PT1 using the MFP 10 (R/W)-mobile terminal PT1 (CE) communication link. When the authentication is failed (e.g., NO in step S38 in FIG. 3), the MFP 10 transmits an NG notification to the mobile terminal PT1.

When the CPU 92 receives the SSID and the password from the MFP 10 using the MFP 10 (R/W)-mobile terminal PT1 (CE) communication link, the CPU 92 makes a positive determination (e.g., YES) in step S72, and the routine proceeds to step S74. When the CPU 92 receives the NG notification from the MFP 10 using the MFP 10 (R/W)-mobile terminal PT1 (CE) communication link, the CPU 92 makes a negative determination (e.g., NO) in step S72, and the routine proceeds to step S86.

In step S74, the CPU 92 returns the state of the NFC I/F 80 from the state where the CE mode is active (e.g., "ON")

and the other modes are inactive (e.g., "OFF") to the state where the P2P mode is active (e.g., "ON") and the other modes are inactive (e.g., "OFF"). More specifically, the CPU 92 ends the CE mode and starts the P2P mode. Thus, the MFP 10 (R/W)-target terminal (CE) communication link is disconnected.

In step S76, the CPU 92 executes processing for establishing wireless connection in conjunction with the MFP 10 using the received SSID and password, to establish wireless connection with the MFP 10. The processing of step S74 and the processing of step S76 are independent of each other and are executed independently at respective predetermined timings subsequent to step S72. Therefore, the sequence of execution of the processing of step S74 and the processing of step S76 is not limited to the above example. In other embodiments, for example, the processing of step S76 may be executed prior to the execution of the processing of step S74. The processing for establishing wireless connection executed in step S76 may be substantially the same as the processing for establishing wireless connection executed in step S82. Upon completion of the processing for establishing wireless connection, the wireless connection is established between the mobile terminal PT1 and the MFP 10. Thus, the mobile terminal PT1 is permitted to participate in the WFDNW in which the MFP 10 serves as a G/O-status device (e.g., the WFDNW configured in step S14 in FIG. 2), as a slave (more specifically, as a station), whereby a belonging situation in which both the MFP 10 and the target terminal belong in the same WFDNW is established. Subsequent to the establishment of the belonging situation, the CPU 92 performs wireless communication of target data (e.g., print data) with the target terminal in the WFDNW via wireless LAN I/F 82. Upon completion of the processing in step S76, the CPU 92 ends the function execution process of FIG. 4. After the wireless communication of target data is performed therebetween, when the CPU 92 determines that the particular function requested by the user of the target terminal is available to the user, the CPU 92 can execute the particular function.

In step S86, the CPU 92 displays a predetermined error message on the display unit 74. In this case, wireless connection is not established between the mobile terminal PT1 and the MFP 10. In step S88, the CPU 92 returns the state of the NFC I/F 80 from the state where the CE mode is active (e.g., "ON") and the other modes are inactive (e.g., "OFF") to the state where the P2P mode is active (e.g., "ON") and the other modes are inactive (e.g., "OFF"). Thus, the MFP 10 (R/W)-target terminal (CE) communication link is disconnected. Upon completion of the processing in step S88, the CPU 92 ends the function execution process of FIG. 4.

Figure 5:
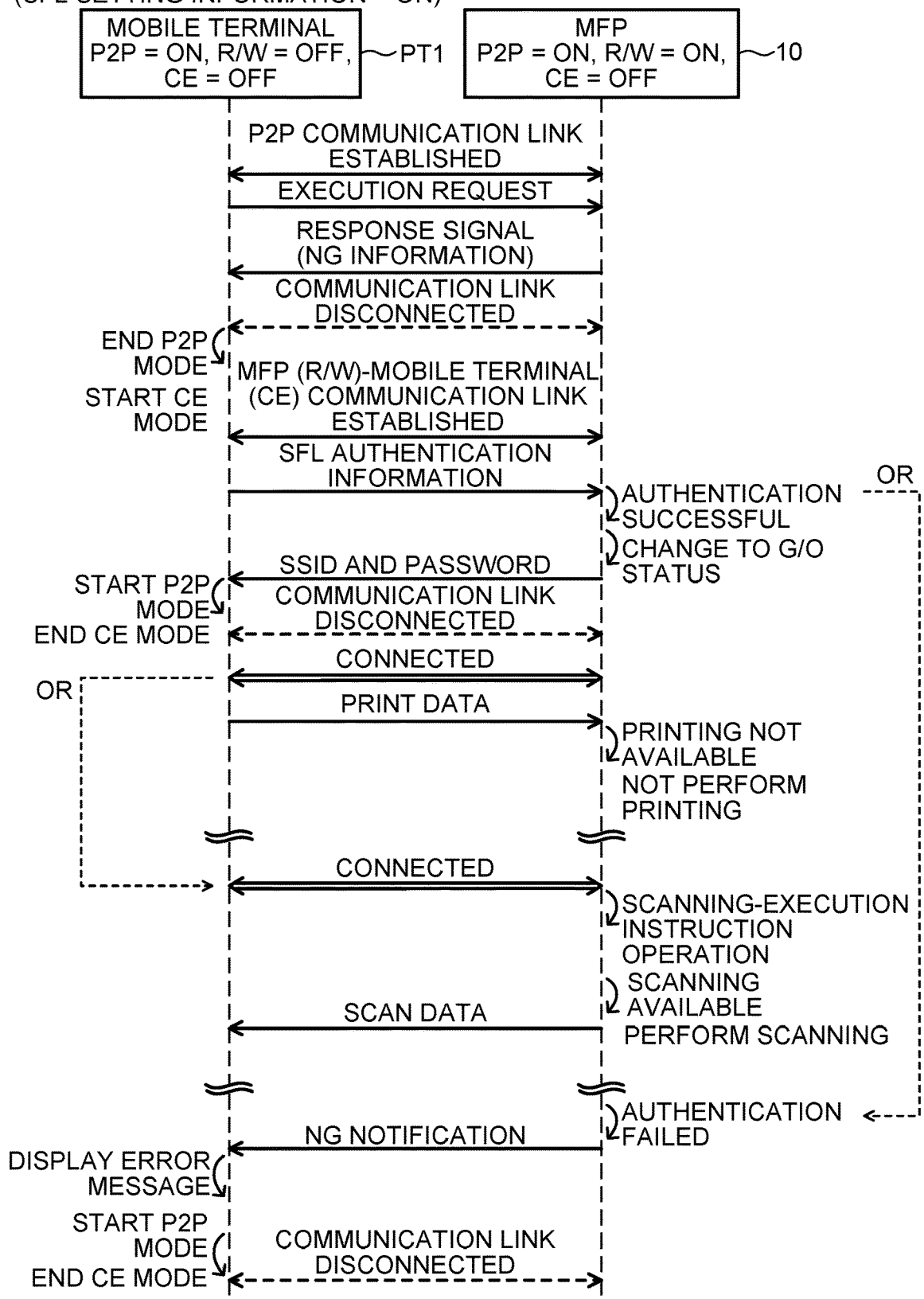
FIG. 5 is a sequence diagram depicting communication performed between devices in Case A1 in the first illustrative embodiment according to one or more aspects of the disclosure.
Figure 6:
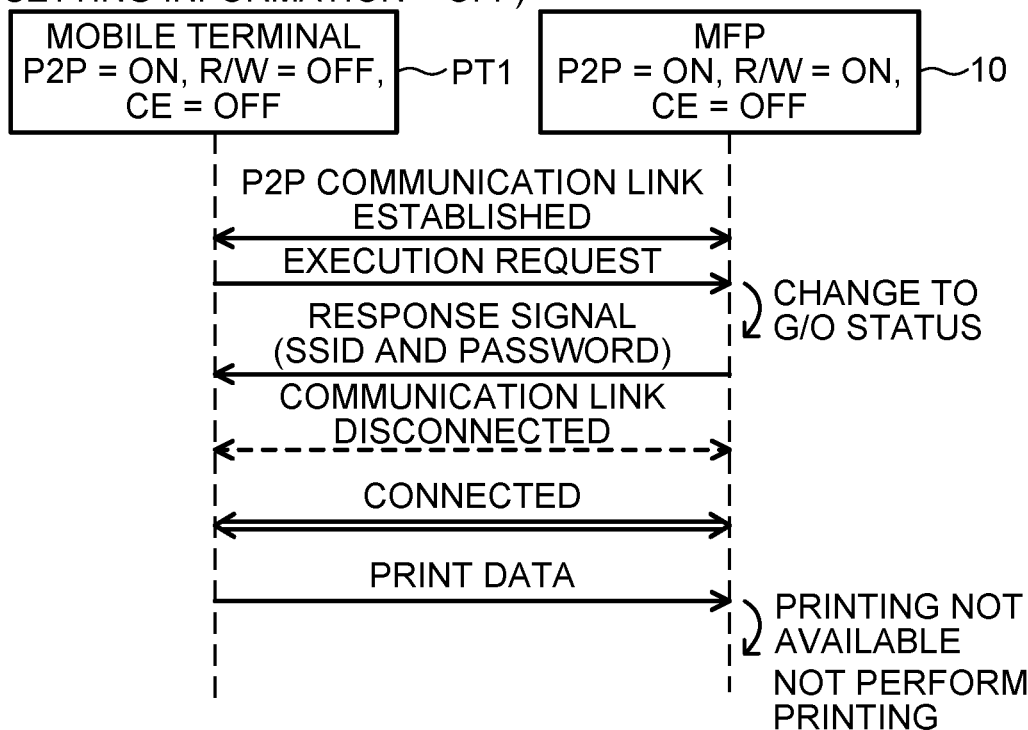
FIG. 6 is a sequence diagram depicting communication performed between devices in Case A2 in the first illustrative embodiment according to one or more aspects of the disclosure.

Referring to FIGS. 5 and 6, various example cases implemented by the flowcharts of FIGS. 2, 3, and 4 will be described.

Referring to FIG. 5, Case A1 will be described below. Example communication that may be performed in Case A1 between the MFP 10 and the mobile terminal PT1 when a P2P communication link is established therebetween while the SFL indicates "ON" in the MFP 10 will be described below.

As the power of the MFP 10 is turned on, the NFC I/F 20 starts operating in the initial state where the P2P mode and the R/W mode are active (e.g., "ON") and the CE mode is inactive (e.g., "OFF"). At this point, the MFP 10 serves as a device-status device that does not belong in any WFDNW. As described above, in Case A1, the SFL of MFP 10 is "ON".

The user of the mobile terminal PT1 performs an application startup operation and an execution instruction operation for instructing execution of a particular function sequentially by operating the operation unit 72 of the mobile terminal PT1. In response to the performance of the execution instruction operation, the NFC I/F 80 of the mobile terminal PT1 starts operating in a state where the P2P mode is active (e.g., "ON") and the R/W mode and the CE mode are inactive (e.g., "OFF").

Then, the user of the mobile terminal PT1 brings the mobile terminal PT1 closer to the MFP 10. As a distance between the NFC I/F 80 of the mobile terminal PT1 and the NFC I/F 20 of the MFP 10 becomes a certain distance or shorter in which communication using the NFC system can be performed therebetween (e.g., approximately 10 cm), a P2P communication link is established between the NFC OF 80 of the mobile terminal PT1 and the NFC I/F 20 of the MFP 10.

The CPU 92 of the mobile terminal PT1 transmits an execution request to the MFP 10 using the established P2P communication link (e.g., via the NFC I/F 80) (e.g., step S60 in FIG. 4).

In Case A1, the SFL setting information 38 (see FIG. 1) indicates "ON". Therefore, in response to the execution request (e.g., step S10 in FIG. 2), the CPU 32 of the MFP 10 transmits a Response signal including NG information to the mobile terminal PT1 using the P2P communication link (e.g., YES in step S12 in FIG. 2 and step S30 in FIG. 3). Subsequent to this, the CPU 32 transmits a Deactivation signal to the target terminal using the P2P communication link (e.g., step S32 in FIG. 3).

In response to the Deactivation signal, the CPU 92 of the mobile terminal PT1 transmits an OK signal to the MFP 10 using the P2P communication link (e.g., step S64 in FIG. 4). Thus, the P2P communication link established between the MFP 10 and the target terminal is disconnected. As the P2P communication link is disconnected, the CPU 92 changes the state of the NFC I/F 80 from the state where the P2P mode is active (e.g., "ON") and the other modes are inactive (e.g., "OFF") to a state where the CE mode is active (e.g., "ON") and the other modes are inactive (e.g., "OFF") (e.g., step S66 in FIG. 4). That is, the CPU 92 ends the P2P mode and starts the CE mode. Subsequent to this, the CPU 92 writes the SFL authentication information (e.g., the user ID (e.g., "U1") and the password (e.g., "P1")) into the NFC I/F 80.

Subsequent to the change of the state of the NFC I/F 80 of the mobile terminal PT1 to the state where the CE mode is active (e.g., "ON") and the other modes are inactive (e.g., "OFF"), an MFP 10 (R/W)-mobile terminal PT1 (CE) communication link is established between the NFC I/F 80 of the MFP 10 and the NFC I/F 20 of the mobile terminal PT1 (e.g., YES in step S34 in FIG. 3 and YES in step S70 in FIG. 4).

The CPU 32 of the MFP 10 receives the SFL authentication information from the mobile terminal PT1 using the established R/W-CE communication link (e.g., step S36 in FIG. 3). Then, the CPU 32 executes authentication using the received SFL authentication information (e.g., the user ID (e.g., "U1") and the password (e.g., "P1")) (e.g., step S38 in FIG. 3). As depicted in FIG. 1, the SFL table 40 includes the combined information including "USER ID=U1" and "PASSWORD=P1". Therefore, the CPU 32 determines that the authentication is successful (e.g., the CPU 32 makes a positive determination (e.g., YES) in step S38 in FIG. 3).

The CPU 32 changes the operating status of the MFP 10 from the device status to the G/O status (e.g., step S40 in FIG. 3). Thus, a WFDNW in which the MFP 10 serves as a G/O-status device (i.e., as a master) is configured. The CPU 32 prepares a wireless profile (e.g., an SSID, a password, an authentication method, and an encryption method) to be used in the WFDNW and stores the prepared wireless profile in the memory 34.

The CPU 32 transmits the SSID and password to be used in the WFD system to the mobile terminal PT1 using the MFP 10 (R/W)-mobile terminal PT1 (CE) communication link (e.g., step S42 in FIG. 3). The CPU 32 transmits the SSID and the password (e.g., step S42 in FIG. 3) in response to the execution request (e.g., step S10 in FIG. 2). That is, the CPU 32 transmits the SSID and the password to the target terminal without receiving a request for transmission of the SSID and the password from the target terminal again.

In Case A1, upon receipt of the SSID and the password (e.g., YES in step S72 in FIG. 4), the CPU 92 of the mobile terminal PT1 returns the state of the NFC I/F 80 from the state where the CE mode is active (e.g., "ON") and the other modes are inactive (e.g., "OFF") to the state where the P2P mode is active (e.g., "ON") and the other modes are inactive (e.g., "OFF") (e.g., step S74 in FIG. 4). More specifically, the CPU 92 ends the CE mode and starts the P2P mode. Thus, the MFP 10 (R/W)-mobile terminal PT1 (CE) communication link is disconnected.

The CPU 92 executes processing for establishing wireless connection in conjunction with the CPU 32 of the MFP 10 using the received SSID and password, to establish wireless connection therebetween (e.g., step S76 in FIG. 4 and step S44 in FIG. 3), whereby a belonging situation in which both the MFP 10 and the mobile terminal PT1 belong in the same WFDNW is established.

In a case where the execution instruction operation performed by the user of the mobile terminal PT1 is a printing-execution request operation for requesting execution of printing, the CPU 92 transmits print data to the MFP 10 using the WFDNW (e.g., step S76 in FIG. 4 and step S44 in FIG. 3) subsequent to the establishment of the belonging situation.

As depicted in FIG. 1, in the SFL table 40, the combined information including "USER ID=U1" and "PASSWORD=P1" further includes "PRINTING=NG". Accordingly, in Case A1, the CPU 32 of the MFP 10 determines that the printing function is not available to the user who is requesting the execution of the printing function and therefore the CPU 32 does not perform the printing function.

In a case where the execution instruction operation performed by the user of the mobile terminal PT1 is a scanning-execution request operation for requesting execution of scanning, the user of the mobile terminal PT1 is allowed to perform a scanning operation by operating the operation unit 12 of the MFP 10 s subsequent to the establishment of the belonging situation.

As depicted in FIG. 1, in the SFL table 40, the combined information including "USER ID=U1" and "PASSWORD=P1" further includes "SCANNING=OK". Accordingly, in Case A1, the CPU 32 of the MFP 10 determines that the scanning function is available to the user who is requesting the execution of the scanning function and thus performs the scanning function. The CPU 32 transmits scan data to the mobile terminal PT1 using the WFDNW (e.g., step S76 in FIG. 4 and step S44 in FIG. 3).

When the SFL table 40 does not include the combined information including "USER ID=U1" and "PASSWORD=P1", the CPU 32 of the MFP 10 determines that the authentication is failed (e.g., the CPU 32 makes a negative determination (e.g., NO) in step S38 in FIG. 3). In this case, the CPU 32 transmits a predetermined NG notification to the target terminal using the MFP 10 (R/W)-target terminal (CE) communication link.

Upon receipt of the NG notification, the CPU 92 of the mobile terminal PT1 displays a predetermined error message on the display unit 74 (e.g., step S86 in FIG. 4). Then, the CPU 92 returns the state of the NFC I/F 80 from the state where the CE mode is active (e.g., "ON") and the other modes are inactive (e.g., "OFF") to the state where the P2P mode is active (e.g., "ON") and the other modes are inactive (e.g., "OFF") (e.g., step S88 in FIG. 4). More specifically, the CPU 92 ends the CE mode and starts the P2P mode. Thus, the MFP 10 (R/W)-mobile terminal PT1 (CE) communication link is disconnected. In this case, wireless connection is not established between the MFP 10 and the mobile terminal PT1.

According to Case A1 of the first illustrative embodiment, when the MFP 10 receives an execution request from the mobile terminal PT1 using the P2P communication link (e.g., the NFC I/F 20) while the SFL is "ON" (e.g., step S10 in FIG. 2), the MFP 10 transmits a Response signal including NG information to the mobile terminal PT1 (e.g., step S30 in FIG. 3). Subsequent to this, as the MFP 10 receives SFL authentication information (e.g., the user ID (e.g., "U1") and the password (e.g., "P1")) from the mobile terminal PT1 using the R/W-CE communication link (e.g., via the NFC I/F 20) (e.g., step S36 in FIG. 3), the MFP 10 executes authentication using the received user ID and password (e.g., step S38 in FIG. 3). That is, the MFP 10 determines whether the combined information including the received user ID and password is included in the SFL table 40 (see FIG. 1). When the authentication is successful (e.g., YES in step S38 in FIG. 3), the MFP 10 changes its operating status to the G/O status (e.g., step S40 in FIG. 3) and transmits, to the mobile terminal PT1, using the R/W-CE communication link, the SSID and password to be used in the WFDNW in which the MFP 10 serves as a G/O-status device (e.g., step S42 in FIG. 3). Subsequent to the establishment of a belonging situation in which both the MFP 10 and the mobile terminal PT1 belong in the same WFDNW, the MFP 10 performs wireless communication of target data (e.g., one of print data and scan data) with the mobile terminal PT1 using the WFDNW (e.g., via the wireless LAN I/F 22). When the authentication is failed (e.g., NO in step S38 in FIG. 3), the MFP 10 transmits an NG notification to the mobile terminal PT1 using the R/W-CE communication link (e.g., step S46 in FIG. 3). In this case, a belonging situation is not established. That is, in Case A1, the MFP 10 may determine whether wireless communication of target data is performed with the mobile terminal PT1 using the WFDNW via the wireless LAN I/F 22 in accordance with whether the authentication is successful. Consequently, according to the MFP 10 of the first illustrative embodiment, communication using appropriate one of the NFC I/F 20 and the wireless LAN I/F 22 may be performed selectively.

The MFP 10 receives the execution request from the mobile terminal PT1 (e.g., step S10 in FIG. 2) and transmits a Response signal including NG information to the mobile terminal PT1, using the P2P communication link established between the MFP 10 and the mobile terminal PT1 (e.g., step S30 in FIG. 3). Subsequently, the MFP 10 receives the SFL authentication information from the mobile terminal PT1 (e.g., step S36 in FIG. 3) and transmits the SSID and the password to the mobile terminal PT1 (e.g., step S42 in FIG. 3), using the MFP 10 (R/W)-mobile terminal PT1 (CE) communication link established after the P2P communication link is disconnected. With this configuration, the MFP 10 may establish an appropriate communication link between the MFP 10 and the mobile terminal PT1, and transmits and receives various information between the MFP 10 and the mobile terminal PT1 appropriately.

In Case A1, subsequent to the disconnection of the P2P communication link, the mobile terminal PT1 changes the state of the NFC I/F 80 from the initial state where the P2P mode is active (e.g., "ON") and the other modes (e.g., the R/W mode and the CE mode) are inactive (e.g., "OFF") to the state where CE mode is active (e.g., "ON") and the other modes (e.g., the R/W mode and the CE mode) are inactive (e.g., "OFF"). As described above, the mobile terminal PT1 may change the state of the NFC I/F 80 appropriately. In another example, if the state of the NFC I/F 80 is maintained in the initial state without being changed to another state, there is a possibility that the mobile terminal PT1 may not be able to transmit the SFL authentication information to the MFP 10 appropriately. If such a situation happens, the user of the mobile terminal PT1 may need to perform an additional operation, e.g., a complicated operation. In this regard, in Case A1 described above, the mobile terminal PT1 changes the state of the NFC I/F 80 to an appropriate state after the P2P communication link is disconnected, whereby the mobile terminal PT1 may transmit the SFL authentication information to the MFP 10 appropriately without requiring the user of additional performance of a complicated operation.

Upon receipt of the Response signal including the SSID and the password (e.g., YES in step S72 in FIG. 4), the mobile terminal PT1 returns the state of the NFC I/F 80 from the state where the CE mode is active (e.g., "ON") and the other modes are inactive (e.g., "OFF") to the state where the P2P mode is active (e.g., "ON") and the other modes are inactive (e.g., "OFF") (e.g., step S74 in FIG. 4). That is, the mobile terminal PT1 may change the state of the NFC I/F 80 appropriately according to the circumstances.

Referring to FIG. 6, Case A2 will be described below. Example communication that may be performed in Case A2 between the MFP 10 and the mobile terminal PT1 when a P2P communication link is established therebetween while the SFL is "OFF" (i.e., the SFL setting information 38 indicates "OFF") will be described.

Each processing executed before a P2P communication link is established between the MFP 10 and the mobile terminal PT1 in Case A2 may be substantially the same as each processing executed before a P2P communication link is established therebetween in Case A1.

The CPU 92 of the mobile terminal PT1 transmits an execution request to the MFP 10 using the established P2P communication link (e.g., step S60 in FIG. 4).

As described above, in Case A2, the SFL setting information 38 (see FIG. 1) indicates "OFF". Therefore, upon receipt of the execution request (e.g., step S10 in FIG. 2), the CPU 32 of the MFP 10 changes the operating status of the MFP 10 from the device status to the G/O status (e.g., NO in step S12, and step S14 in FIG. 2). Thus, a WFDNW in which the MFP 10 serves as a G/O-status device is configured. The CPU 32 prepares a wireless profile (e.g., an SSID, a password, an authentication method, and an encryption method) to be used in the WFDNW and stores the prepared wireless profile in the memory 34.

Subsequent to this, the CPU 32 transmits, to the mobile terminal PT1, a Response signal including the SSID and password to be used in communication using the WFD system, via the P2P communication link (e.g., step S16 in FIG. 2).

Then, the CPU 92 of the mobile terminal PT1 executes processing for establishing wireless connection in conjunction with the CPU 32 of the MFP 10 using the received SSID and password, to establish wireless connection therebetween (e.g., step S76 in FIG. 4 or step S18 in FIG. 2). Thus, a belonging situation in which both the MFP 10 and the mobile terminal PT1 belong in the same WFDNW is established.

In Case A2, the execution instruction operation performed by the user of the mobile terminal PT1 is a printing-execution instruction operation for requesting execution of the printing function. Therefore, subsequent to the establishment of the belonging situation, the CPU 92 transmits print data to the MFP 10 in the WFDNW (e.g., step S76 in FIG. 4 and step S18 in FIG. 2). Similar to Case A1, the CPU 32 of the MFP 10 determines that printing not available to the user who is requesting the execution of the printing function and thus does not perform the printing function.

In Case A2, subsequently to this, the P2P communication link established between the MFP 10 and the mobile terminal PT1 is disconnected in an arbitrary manner. For example, the CPU 32 of the MFP 10 may transmit a Deactivation signal to the mobile terminal PT1 to disconnect the P2P communication link. In other embodiments, for example, the user of the mobile terminal PT1 may move the mobile terminal PT1 away from the MFP 10 out of the range in which the target terminal can perform communication using the NFC system with the MFP 10, to disconnect the P2P communication link.

According to Case A2 of the first illustrative embodiment, in contrast to Case A1, the SFL is "OFF". In Case A2, upon receipt of the execution request from the mobile terminal PT1 using the P2P communication link (e.g., step S10 in FIG. 2), the MFP 10 changes its operating status to the G/O status (e.g., step S14 in FIG. 2) and transmits, to the mobile terminal PT1, a Response signal including an SSID and password to be used in the WFDNW in which the MFP 10 serves as a G/O-status device (i.e., as a master) (e.g., step S16 in FIG. 2) as distinct from Case A1. That is, according to the illustrative embodiment, the MFP 10 may transmit an appropriate one of the Response signal including NG information and the Response signal including the SSID and password in accordance with whether the SFL is "ON" or "OFF". Therefore, the MFP 10 may operate appropriately in accordance with whether the SFL is "ON" or "OFF".

The MFP 10 may be an example of a "communication device". Each of the mobile terminals PT1, PT2, and PT3 may be an example of a "terminal device". The NFC system may be an example of a "first system" and "short-range wireless communication protocol". The WFD system may be an example of a "second system" and "Wi-Fi-compliant communication protocol". Each of the NFC I/Fs 20 and 80 may be an example of a "first interface" and "short-range wireless interface". Each of the wireless LAN I/Fs 22 and 82 may be an example of a "second interface" and "Wi-Fi interface". The execution request may be an example of "particular request information" and "request information". The SSID and the password to be used in the WFDNW in which the MFP 10 serves as a G/O-status device may be an example of "network information". The Response signal including the NG information may be an example of "first response information". The Response signal including the SSID and the password may be an example of "second response information". In other words, the first response information may be information for notifying the terminal device to provide the authentication information. The SFL authentication information may be an example of "particular authentication information" and "authentication information". The SFL table 40 may be an example of a "list used for authentication". The SFL setting information 38 may be an example of "setting information". The authentication executed in step S38 in FIG. 3 may be an example of a "first determination process". The P2P communication link established between the MFP 10 and the mobile terminal PT1 may be an example of a "first communication link". The MFP 10 (R/W)-mobile terminal PT1 (CE) communication link established between the MFP 10 and the mobile terminal PT1 may be an example of a "second communication link". The P2P mode of the MFP 10 may be an example of a "first mode". The R/W mode of the MFP 10 may be an example of a "second mode" and "another mode". The P2P mode of the mobile terminal PT1 may be an example of a "third mode". The CE mode mobile of the terminal PT1 may be an example of a "fourth mode" and "another mode".

The processing executed in step S10 in FIG. 2 may be an example of processing executed by a "requested information reception portion" of the "communication device". The processing executed in step S30 in FIG. 3 may be an example of processing executed by a "first response portion" of the "communication device". The processing executed in step S38 in FIG. 3 may be an example of processing executed by a "first determination portion" of the "communication device". The processing executed in each of steps S42 and S46 in FIG. 3 may be an example of processing executed by a "first communication portion" of the "communication device". The processing executed in step S44 in FIG. 3 may be an example of processing executed by an "execution portion" of the "communication device". The processing executed in step S16 in FIG. 2 may be an example of processing executed by a "second response portion" of the "communication device".

The processing executed in step S60 in FIG. 4 may be an example of processing executed by a "request-information transmission portion" of the "terminal device". The processing executed in each of steps S62 and S80 in FIG. 4 may be an example of processing executed by a "response reception portion" of the "terminal device". The processing executed in step S68 in FIG. 4 may be an example of processing executed by an "authentication-information transmission portion" of the "terminal device". The processing executed in step S72 in FIG. 4 may be an example of processing executed by a "communication portion" of the "terminal device". The processing executed in each of steps S76 and S86 in FIG. 4 may be an example of processing executed by an "execution portion" of the "terminal device". The processing executed in each of steps S74 and S88 in FIG. 4 may be an example of processing executed by a "state change portion" of the "terminal device".

Figure 7:
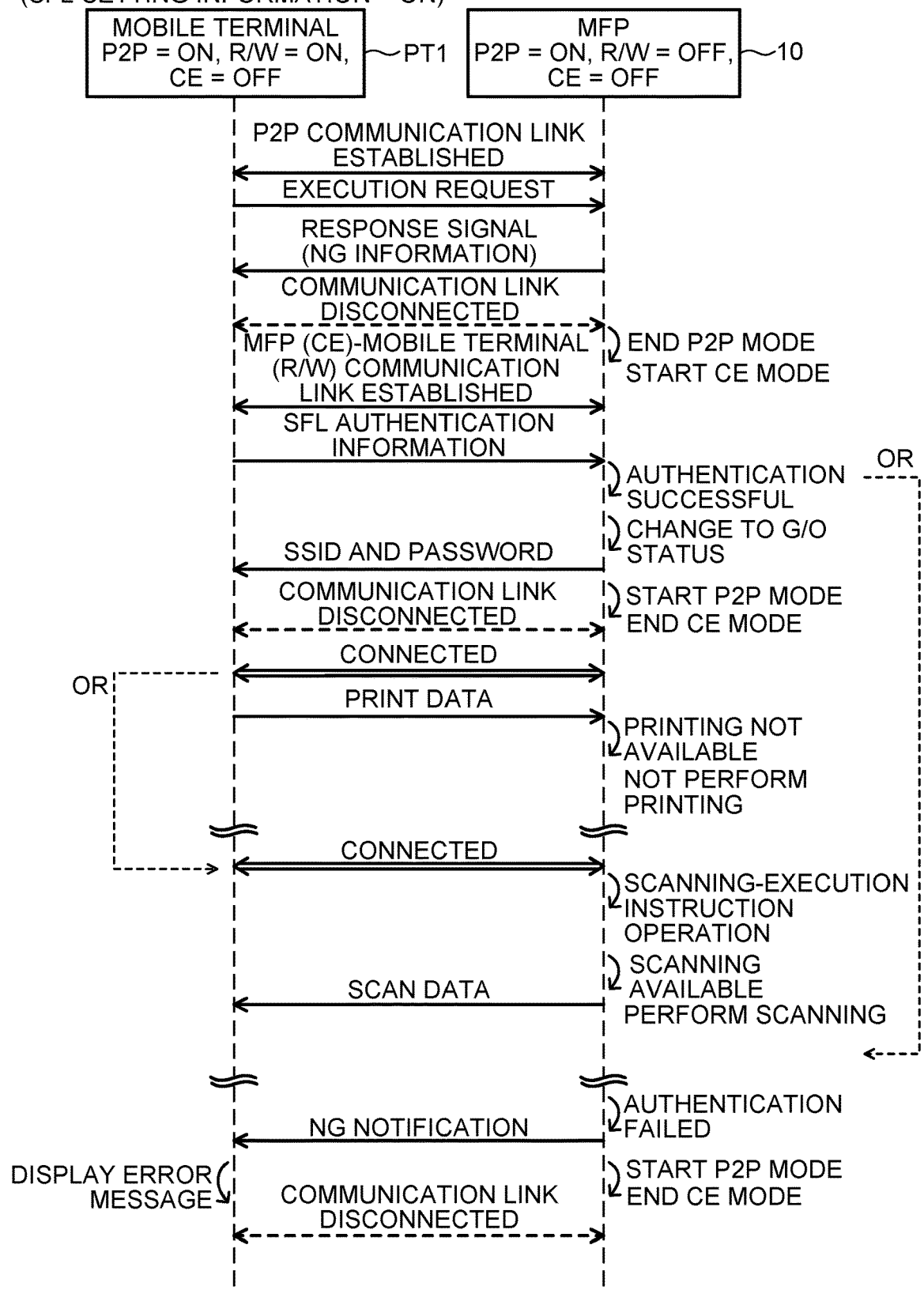
FIG. 7 is a sequence diagram depicting communication performed between devices in Case B in a second illustrative embodiment according to one or more aspects of the disclosure.

Hereinafter, a second illustrative embodiment will be described mainly with different points from the first illustrative embodiment. In the second illustrative embodiment, as depicted in FIG. 7, when a P2P communication link is established between the MFP 10 and the mobile terminal PT1 while the SFL is "ON" in the MFP 10, the MFP 10 and the mobile terminal PT1 may operate differently from the MFP 10 and the mobile terminal PT1 that operate in the respective manners in Case A1 (see FIG. 5) in the first illustrative embodiment. When the SFL is "OFF" in the MFP 10, the MFP 10 and the mobile terminal PT1 may operate substantially the same as the MFP 10 and the mobile terminal PT1 that operate in the respective manners in Case A2 (see FIG. 6) in the first illustrative embodiment, and therefore, a description for such a case will be omitted.

Referring to FIG. 7, Case B will be described below. In Case B, as the power of the MFP 10 is turned on, the NFC I/F 20 starts operating in an initial state where the P2P mode is active (e.g., "ON") and the other modes (e.g., the R/W mode and the CE mode) are inactive (e.g., "OFF"). At this point, the MFP 10 serves as a device-status device that does not belong in any WFDNW, and the SFL is "ON" in the MFP 10.

As the user of the mobile terminal PT1 performs an application startup operation and an execution instruction operation, the NFC I/F 80 of the mobile terminal PT1 starts operating in the state where the P2P mode and the R/W mode are active (e.g., "ON") and the CE mode is inactive (e.g., "OFF").

As the user of the mobile terminal PT1 brings the mobile terminal PT1 closer to the MFP 10, a P2P communication link is established between the MFP 10 and the mobile terminal PT1.

Processing of subsequent steps executed until the P2P communication link established between the MFP 10 and the target terminal is disconnected (e.g., processing of a step in which the CPU 32 of the MFP 10 receives an execution request from the mobile terminal PT1 and processing of a step in which the CPU 32 of the MFP 10 transmits a Response signal including NG information to the mobile terminal PT1) may be substantially the same as the processing of the steps executed in Case A1 (see FIG. 5) according to the first illustrative embodiment, and therefore, a description for the processing of such steps will be omitted.

In Case B, as the P2P communication link is disconnected, the CPU 32 of the MFP 10 changes the state of the NFC I/F 20 from the state where the P2P mode is active (e.g., "ON") and the other modes are inactive (e.g., "OFF") to the state where the CE mode is active (e.g., "ON") and the other modes are inactive (e.g., "OFF"). That is, the CPU 32 ends the P2P mode and starts the CE mode.

When the state of the NFC I/F 20 changes to the state where the CE mode is active (e.g., "ON") and the other modes are inactive (e.g., "OFF"), an MFP 10(CE)-mobile terminal PT1(R/W) communication link is established between the NFC I/F 80 of the mobile terminal PT1 and the NFC I/F 20 of the MFP 10.

The CPU 92 of the mobile terminal PT1 transmits SFL authentication information from the mobile terminal PT1 to the MFP 10 using the established R/W-CE communication link. More specifically, the CPU 92 writes the SFL authentication information into the NFC I/F 20 of the MFP 10.

Upon receipt of the SFL authentication information, the CPU 32 of the MFP 10 executes authentication using the received SFL authentication information.

When the CPU 32 of the MFP 10 determines that the authentication is successful, the CPU 32 changes the operating status of the MFP 10 from the device status to the G/O status. Thus, a WFDNW in which the MFP 10 serves as a G/O-status device (i.e., as a master) is configured. The CPU 32 prepares a wireless profile (e.g., an SSID, a password, an authentication method, and an encryption method) to be used in the WFDNW and stores the prepared wireless profile in the memory 34. Then, the CPU 32 writes, into the NFC I/F 20, the SSID and password to be used in communication using the WFD system.

The CPU 92 of the mobile terminal PT1 receives the SSID and password to be used in communication using the WFD system from the MFP 10 using the MFP 10(CE)-mobile terminal PT1(R/W) communication link. More specifically, the CPU 92 reads and obtains the SSID and the password from the NFC I/F 20 of the MFP 10.

In Case B, as the CPU 92 of the mobile terminal PT1 reads the SSID and the password, the CPU 32 of the MFP 10 returns the state of the NFC I/F 20 from the state where the CE mode is active (e.g., "ON") and the other modes are inactive (e.g., "OFF") to the state where the P2P mode is active (e.g., "ON") and the other modes are inactive (e.g., "OFF"). More specifically, the CPU 32 ends the CE mode and starts the P2P mode. Thus, the MFP 10(CE)-mobile terminal PT1(R/W) communication link is disconnected.

Processing of subsequent steps executed between the CPU 92 of the mobile terminal PT1 and the CPU 32 of the MFP 10 may be substantially the same as the processing of the steps executed in Case A1 (see FIG. 5) according to the first illustrative embodiment, and therefore, a description for the processing of such steps will be omitted.

When the CPU 32 of the MFP 10 determines that the authentication is failed, the CPU 32 writes an NG notification into the NFC I/F 20 instead of the SSID and the password.

In response to this, the CPU 92 of the mobile terminal PT1 receives the NG notification from the MFP 10 using the MFP 10(CE)-mobile terminal PT1(R/W) communication link. More specifically, the CPU 92 reads and obtains the NG notification from the NFC I/F 20 of the MFP 10.

Upon receipt of the NG notification, the CPU 92 of the mobile terminal PT1 displays a predetermined error message on the display unit 74.

As the CPU 92 of the mobile terminal PT1 reads out the NG notification, the CPU 32 of the MFP 10 returns the state of the NFC I/F 20 from the state where the CE mode is active (e.g., "ON") and the other modes are inactive (e.g., "OFF") to the state where the P2P mode is active (e.g., "ON") and the other modes are inactive (e.g., "OFF"). Thus, the MFP 10(CE)-mobile terminal PT1(R/W) communication link is disconnected.

According to the second illustrative embodiment, in Case B (see FIG. 7), subsequent to the disconnection of the P2P communication link, the MFP 10 changes the state of the NFC I/F 20 from the initial state where the P2P mode is active (e.g., "ON") and the other modes (e.g., the R/W mode and the CE mode) are inactive (e.g., "OFF") to the state where the CE mode is active (e.g., "ON") and the other modes (e.g., the R/W mode and the CE mode) are inactive (e.g., "OFF"). As described above, the MFP 10 may change the state of the NFC I/F 20 appropriately.

The P2P mode of the NFC I/F 20 of the MFP 10 may be another example of the "first mode". The CE mode of the NFC I/F 20 of the MFP 10 may be another example of the "second mode" and "another mode". The P2P mode of the NFC I/F 80 of the mobile terminal PT1 may be another example of the "third mode". The R/W mode of the NFC I/F 80 of the mobile terminal PT1 may be another example of the "fourth mode" and "another mode". The processing in which the CPU 32 of the MFP 10 changes the state of the NFC I/F 20 from the initial state where the P2P mode is active and the other modes (e.g., the R/W mode and the CE mode) are inactive to the state where the CE mode is active and the other modes (e.g., the R/W mode and the CE mode) are inactive after the P2P communication link is disconnected in Case B (see FIG. 7) may be another example of the processing executed by the "state change portion" of the "communication device".

Hereinafter, a third illustrative embodiment will be described mainly with different points from the first illustrative embodiment. The contents of the SFL table 40 may be different between the third illustrative embodiment and the first illustrative embodiment. As depicted in FIGS. 10 and 12, the SFL table 40 includes a plurality pieces of combined information, each of which include, for example, a user ID (e.g., "U1"), a password (e.g., "P1"), availability information for printing function (e.g., "OK" or "NG"), availability information for scanning function (e.g., "OK" or "NG"), and availability information for handover ("H/O") (e.g., "OK" or "NG"), which are associated with each other. In each combined information, the availability information for printing function indicates whether the printing function is available to the user. The availability information for scanning function indicates whether the scanning function is available to the user. The availability information for H/O indicates whether the user is allowed to perform a handover. The handover may be performed to establish a belonging situation in which both a mobile terminal (e.g., the mobile terminal PT1) and the MFP 10 belong in the same WFDNW. For example, the SFL table 40 depicted in FIG. 10 includes combined information including "USER ID=U1", "PASSWORD=P1", "PRINTING=NG", "SCANNING=OK", "H/O=NG" which are associated with each other.

Figure 8:
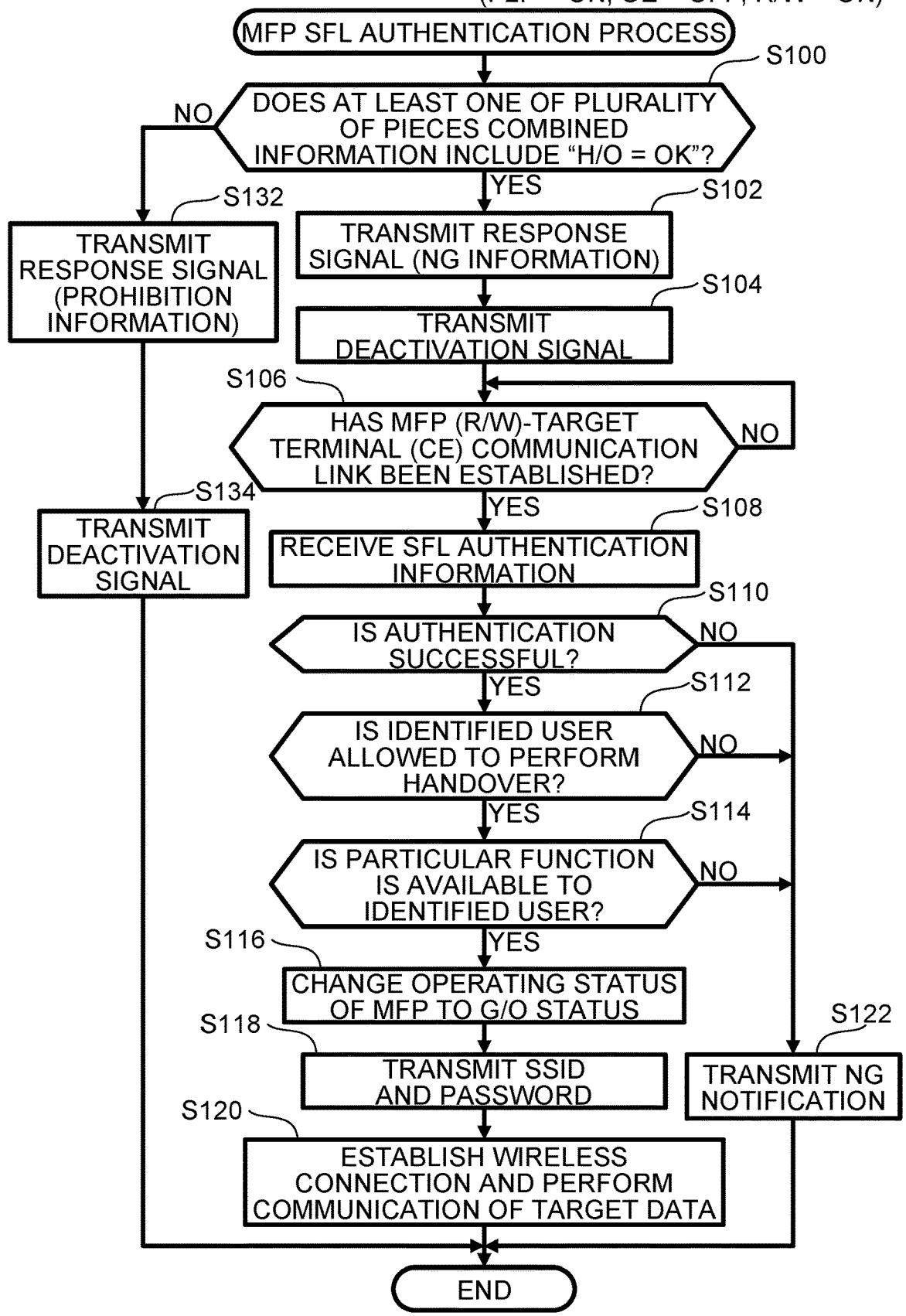
FIG. 8 is a flowchart depicting an example SFL authentication process executed in the MFP in a third illustrative embodiment according to one or more aspects of the disclosure.

In the third illustrative embodiment, depicted in FIG. 8, the detail of the SFL authentication process executed by the CPU 32 of the MFP 10 may be different from the SFL authentication process executed by the CPU 32 of the MFP 10 in the first illustrative embodiment. When a negative determination (e.g., NO) is made in step S12 in FIG. 2 in the third illustrative embodiment, the same processing as the processing executed in step 14 and subsequent steps according to the first illustrative embodiment are executed in steps subsequent to step 12 in the third illustrative embodiment, and therefore, a description for the processing of such steps will be omitted.

Referring to FIG. 8, the detail of the SFL authentication process executed in the MFP 10 in step S20 in FIG. 2 according to the third illustrative embodiment will be described. When the SFL setting information 38 indicates "ON" (e.g., YES in step S12 in FIG. 2) at the time of receiving an execution request from a target terminal using a P2P communication link established between the MFP 10 and the target terminal (e.g., step S10 in FIG. 2), the CPU 32 executes the SFL authentication process in FIG. 8.

In step S100, the CPU 32 determines whether at least one of the users is allowed to perform a handover. More specifically, in step S100, the CPU 32 determines whether at least one of the plurality of pieces of combined information include "H/O=OK" with reference to the SFL table 40. As depicted in FIG. 10, when the CPU 32 determines that all of the one or more pieces of the combined information stored in the SFL table 40 include "H/O=OK", the CPU 32 makes a negative determination (e.g., NO) in step S100, and the routine proceeds to step S132. As depicted in FIG. 12, when the CPU 32 determines that at least one of the plurality of pieces of combined information includes "H/O=OK" in the SFL table 40, the CPU 32 makes a positive determination (e.g., OK) in step S100, and the routine proceeds to step S102.

In step S132, the CPU 32 transmits a Response signal including predetermined prohibition information to the target terminal using the P2P communication link established between the MFP 10 and the target terminal. The prohibition information indicates none of the users is allowed to perform a handover. In step S134, the CPU 32 transmits a Deactivation signal to the target terminal using the P2P communication link.

In response to the Deactivation signal, the target terminal transmits an OK signal to the MFP 10 using the P2P communication link. Thus, the P2P communication link established between the MFP 10 and the target terminal is disconnected. Upon completion of the processing in step S134, the CPU 32 ends the SFL authentication process of FIG. 8 and the communication process of FIG. 2.

In step S102, the CPU 32 transmits a Response signal including NG information to the target terminal using the P2P communication link established between the MFP 10 and the target terminal. Processing executed in steps S104, S106, S108, and S110 subsequent to step S102 may be substantially the same as the processing executed in steps S32, S34, S36, and S38, respectively, in FIG. 3, and therefore, a detailed description for the processing of such steps will be omitted. The processing of step S110 may be an example of the situation in which "the authentication information is correct". When the CPU 32 makes a positive determination (e.g., YES) in step S110 (e.g., when the CPU 32 determines that the authentication is successful), the routine proceeds to step S112. When the CPU 32 makes a negative determination (e.g., NO) in step S110 (e.g., when the CPU 32 determines that the authentication is failed), the routine proceeds to step S122.

In step S112, the CPU 32 determines whether the user identified by the user ID received in step S108 is allowed to perform a handover. More specifically, in step S112, the CPU 32 determines whether "H/O=OK" is associated with the user ID received in step S108 with reference to the SFL table 40 (see FIG. 12). When the CPU 32 determines that "H/O=OK" is associated with the user ID received in step S108, the CPU 32 makes a positive determination (e.g., YES) in step S112, and the routine proceeds to step S114. When the CPU 32 determines that "H/O=NG" is not associated with the user ID received in step S108, the CPU 32 makes a negative determination (e.g., NO) in step S112, and the routine proceeds to step S122.

In step S114, the CPU 32 determines whether the particular function designated by the execution request is available to the user identified by the user ID received in step S108. More specifically, in step S114, the CPU 32 determines whether "PRINTING=OK" (or "SCANNING=OK") is associated with the user ID received in step S108 with reference to the SFL table 40 (see FIG. 12). For example, in a case where the particular function designated by the execution request is the printing function and "PRINTING=OK" is associated with the user ID received in step S108, the CPU 32 makes a positive determination (e.g., YES) in step S114, and the routine proceeds to step S116. In a case where the particular function designated by the execution request is the printing function and "PRINTING=NG" is associated with the user ID received in step S108, the CPU 32 makes a negative determination (e.g., NO) in step S114, and the routine proceeds to step S122.

Processing executed in steps S116, S118, and S120 subsequent to S114 may be substantially the same as the processing executed in steps S40, S42, and S44 in FIG. 3, and therefore, a detailed description for the processing of such steps will be omitted. Upon completion of the processing in step S120, the CPU 32 ends the SFL authentication process of FIG. 8 and the communication process of FIG. 2.

In step S122, the CPU 32 transmits a predetermined NG notification to the target terminal using the MFP 10 (R/W)-target terminal (CE) communication link in a similar manner to step S46 in FIG. 3. In this case, wireless connection is not established between the MFP 10 and the target terminal. Upon completion of the processing in step S122, the CPU 32 ends the SFL authentication process of FIG. 8 and the communication process of FIG. 2.

Figure 9:
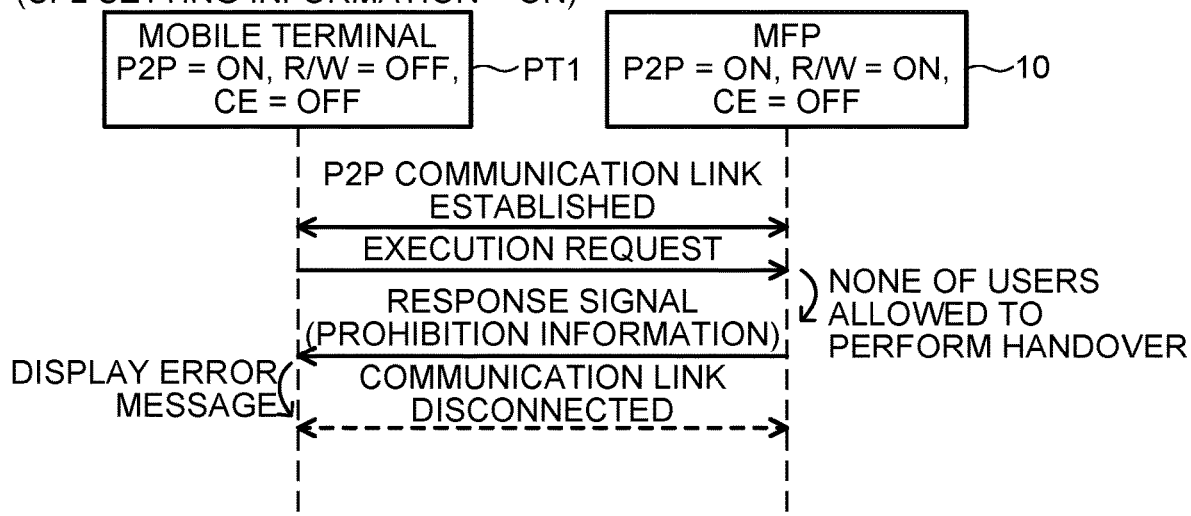
FIG. 9 is a sequence diagram depicting communication performed between devices in Case C1 in the third illustrative embodiment according to one or more aspects of the disclosure.
Figure 11:
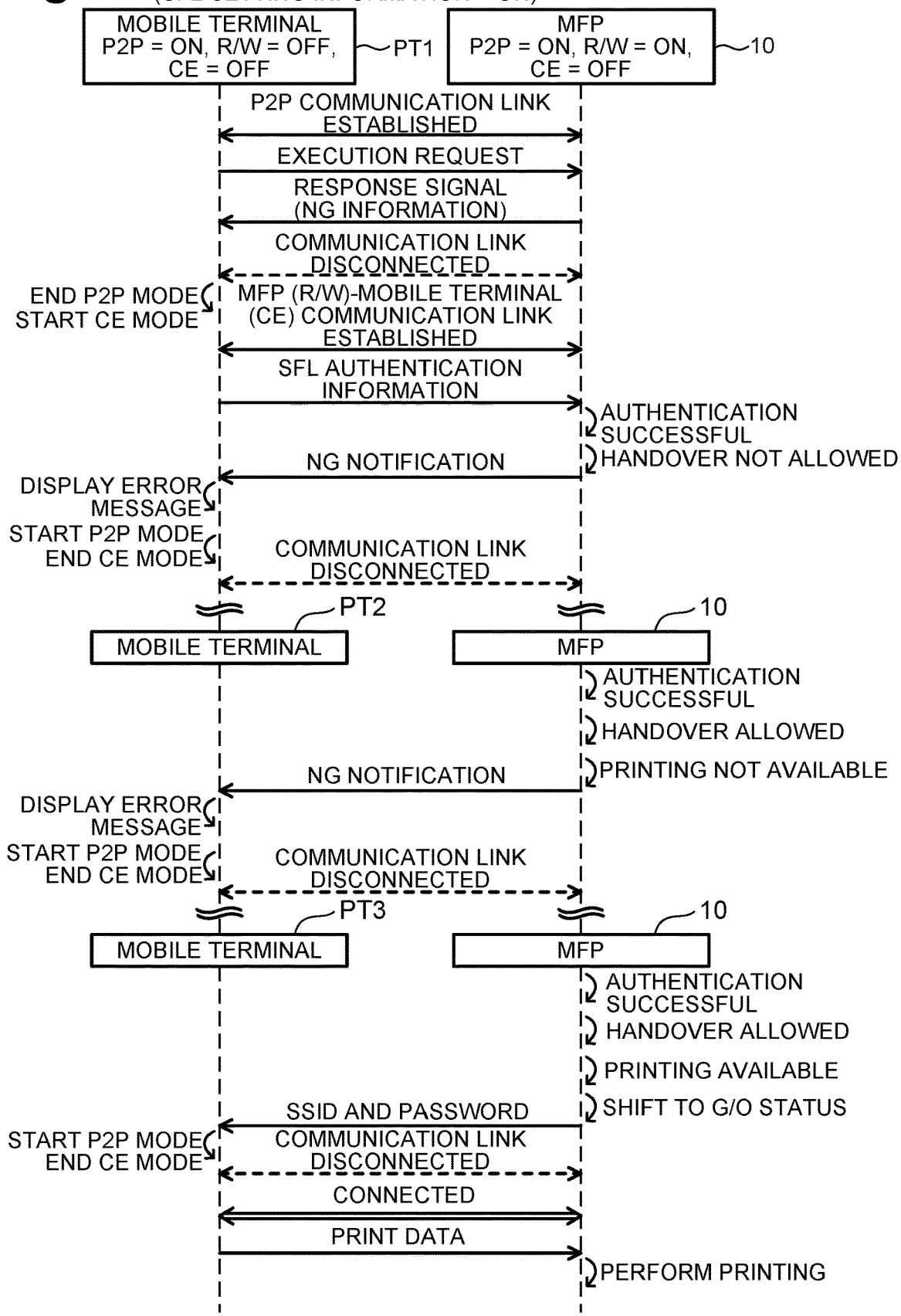
FIG. 11 is a sequence diagram depicting communication performed between devices in Case C2 in the third illustrative embodiment according to one or more aspects of the disclosure.

In the third illustrative embodiment, as depicted in FIGS. 9 and 11, when a P2P communication link is established between the MFP 10 and the mobile terminal PT1 while the SFL is "ON" in the MFP 10, the MFP 10 and the mobile terminal PT1 may operate differently from the MFP 10 and the mobile terminal PT1 that operate in the respective manners in Case A1 (see FIG. 5) in the first illustrative embodiment. Referring to FIGS. 9, 10, 11, and 12, example cases will be described.

Referring to FIG. 9, Case C1 will be described below. In Case C1, communication may be performed between the MFP 10 and the mobile terminal PT1 when a P2P communication link is established between the MFP 10 and the mobile terminal PT1 while the SFL is "ON" in the MFP 10. In Case C1, an SFL table 40 depicted in FIG. 10 is stored in the memory 34 of the MFP 10.

Processing of steps executed between when the CPU 32 of the MFP 10 receives an execution request and when the P2P communication link is established between the MFP 10 and the mobile terminal PT1 may be substantially the same as the processing of the steps executed in Case A1 (see FIG. 5) in the first illustrative embodiment.

In Case C1, upon receipt of an execution request, the CPU 32 of the MFP 10 determines whether at least one of the users is allowed to perform a handover (e.g., step S100 in FIG. 8). In Case C1, as depicted in FIG. 10, all of a plurality of pieces of combined information stored in the SFL table 40 include "H/O=NG". Therefore, the CPU 32 determines that none of the users is allowed to perform a handover (e.g., the CPU 32 makes a negative determination (e.g., NO) in step S100 in FIG. 8).

The CPU 32 of the MFP 10 transmits a Response signal including prohibition information to the mobile terminal PT1 using the P2P communication link (e.g., step S132 in FIG. 8).

Upon receipt of the Response signal including prohibition information, the CPU 92 of the mobile terminal PT1 displays a predetermined error message on the display unit 74.

Subsequent to this, the CPU 32 of the MFP 10 transmits a Deactivation signal to the target terminal using the P2P communication link (e.g., step S134 in FIG. 8).

In response to the Deactivation signal, the CPU 92 of the mobile terminal PT1 transmits an OK signal to the MFP 10 using the P2P communication link. Thus, the P2P communication link established between the MFP 10 and the target terminal is disconnected.

Referring to FIGS. 11 and 12, Case C2 will be described below. In Case C2, the MFP 10 stores therein an SFL table 40 depicted in FIG. 12. Processing of steps executed between when the CPU 32 of the MFP 10 receives an execution request and when the P2P communication link is established between the MFP 10 and the mobile terminal PT1 may be substantially the same as the processing of the steps executed in Case A1 (see FIG. 5) according to the first illustrative embodiment. In Case C2, the execution request includes information for requesting execution of the printing function.

In Case C2, upon receipt of the execution request, the CPU 32 of the MFP 10 determines whether at least one of the users is allowed to perform a handover (e.g., step S100 in FIG. 8). In Case C2, as depicted in FIG. 12, there is at least one of the plurality of pieces of combined information includes "H/O=OK" in the SFL table 40. Therefore, the CPU 32 determines that at least one of the users is allowed to perform a handover (e.g., the CPU 32 makes a positive determination (e.g., YES) in step S100 in FIG. 8).

The CPU 32 of the MFP 10 transmits a Response signal including NG information to the mobile terminal PT1 using the P2P communication link (e.g., step S102 in FIG. 8). Then, the P2P communication link established between the MFP 10 and the target terminal is disconnected.

Subsequent to the disconnection of the P2P communication link, the CPU 92 changes the state of the NFC I/F 80 from the state where the P2P mode is active and the other modes are inactive to the state where the CE mode is active (e.g., "ON") and the other modes are inactive (e.g., "OFF") (e.g., step S66 in FIG. 4). The CPU 92 writes the SFL authentication information (e.g., the user ID (e.g., "U1") and the password (e.g., "P1")) into the NFC I/F 80.

Subsequent to this, an MFP 10 (R/W)-mobile terminal PT1 (CE) communication link is established between the NFC I/F 80 of the mobile terminal PT1 and the NFC I/F 20 of the MFP 10 (e.g., YES in step S106 in FIG. 8 or YES in step S70 in FIG. 4).

The CPU 32 of the MFP 10 receives the SFL authentication information from mobile terminal PT1 using the established R/W-CE communication link (e.g., step S108 in FIG. 8). Subsequent to this, the CPU 32 executes authentication using the received SFL authentication information (e.g., the user ID (e.g., "U1") and the password (e.g., "P1")) (e.g., step S110 in FIG. 8). As depicted in FIG. 12, the SFL table 40 includes the combined information including "USER ID=U1" and "PASSWORD=P1". Therefore, in Case C2, the CPU 32 determines that the authentication is successful (e.g., the CPU 32 makes a positive determination (e.g., YES) in step S110 in FIG. 8).

Subsequently, the CPU 32 determines whether the user identified by the user ID (e.g., "U1") is allowed to perform a handover (e.g., step S112 in FIG. 8). As depicted in FIG. 12, "H/O=NG" is associated with the user ID (e.g., "U1"). Therefore, the CPU 32 determines that the identified user is not allowed to perform a handover (e.g., NO in step S112 in FIG. 8), and transmits an NG notification to the mobile terminal PT1 using the R/W-CE communication link (e.g., step S122 in FIG. 8).

Upon receipt of the NG notification, the CPU 92 of the mobile terminal PT1 displays a predetermined error message on the display unit 74 (e.g., step S86 in FIG. 4). Subsequent to this, the CPU 92 returns the state of the NFC I/F 80 from the state where the CE mode is active (e.g., "ON") and the other modes are inactive (e.g., "OFF") to the state where the P2P mode is active (e.g., "ON") and the other modes are inactive (e.g., "OFF") (e.g., step S88 in FIG. 4). Thus, the MFP 10 (R/W)-mobile terminal PT1 (CE) communication link is disconnected. In this case, wireless connection is not connected between the MFP 10 and the mobile terminal PT1.

Hereinafter, another example case in which, in place of the mobile terminal PT1, the mobile terminal PT2 (see FIG. 1) establishes a P2P communication link with the MFP 10 and transmits, to the MFP 10, an execution request for execution of the printing function, will be described. Processing of steps executed between when the CPU 32 of the MFP 10 receives SFL authentication information and the P2P communication link is established between the MFP 10 and the mobile terminal PT2 may be substantially the same as the processing of the steps executed in the example case of the mobile terminal PT1. In this case, the SFL authentication information that the MFP 10 receives from the mobile terminal PT2 includes a user ID (e.g., "U2") and a password (e.g., "P2") associated with the mobile terminal PT2. As depicted in FIG. 12, the SFL table 40 includes combined information including "USER ID=U2" and "PASSWORD=P2". Therefore, in this case, also, the CPU 32 determines that the authentication is successful (e.g., the CPU 32 makes a positive determination (e.g., YES) in step S110 in FIG. 8).

Subsequent to this, the CPU 32 determines whether the user identified by the user ID (e.g., "U2") is allowed to perform a handover (e.g., step S112 in FIG. 8). As depicted in FIG. 12, "H/O=OK" is associated with the "USER ID=U2" in the SFL table 40. Therefore, the CPU 32 determines that the identified user is allowed to perform a handover (e.g., YES in step S112 in FIG. 8).

Subsequently, the CPU 32 determines whether the printing function is available to the user identified by the user ID (e.g., "U2") (e.g., step S114 in FIG. 8). As depicted in FIG. 12, "PRINTING=NG" is associated with the "USER ID=U2" in the SFL table 40. Therefore, the CPU 32 determines that the printing function is not available to the identified user (e.g., NO in step S114 in FIG. 8), and transmits an NG notification to the mobile terminal using the R/W-CE communication link (e.g., step S122 in FIG. 8). Processing of subsequent steps may be substantially the same as the processing of the steps executed in the example case of the mobile terminal PT1.

Hereinafter, other example case in which, in place of the mobile terminal PT1, the mobile terminal PT3 (see FIG. 1) establishes a P2P communication link with the MFP 10 and transmits, to the MFP 10, an execution request for execution of the printing function, will be described. Processing of steps executed between when the CPU 32 of the MFP 10 receives SFL authentication information and the P2P communication link is established between the MFP 10 and the mobile terminal PT3 may be substantially the same as the processing of the steps executed in the example case of the mobile terminal PT1. In this case, the SFL authentication information that the MFP 10 receives from the mobile terminal PT3 includes a user ID (e.g., "U3") and a password (e.g., "P3") associated with the mobile terminal PT3. As depicted in FIG. 12, the SFL table 40 includes combined information including "USER ID=U3" and "PASSWORD=P3". Therefore, the CPU 32 determines that the authentication is successful (e.g., the CPU 32 makes a positive determination (e.g., YES) in step S110 in FIG. 8). Since "H/O=OK" is associated with "USER ID=U3" in the SFL table 40, subsequently, the CPU 32 determines that the identified user is allowed to perform a handover (e.g., YES in step S112 in FIG. 8). In the SFL table 40, "PRINTING=OK" is further associated with "USER ID=U3". Therefore, the CPU 32 determines that the printing function is available to the identified user (e.g., YES in step S114 in FIG. 8).

In this case, the CPU 32 changes the operating status of the MFP 10 from the device status to the G/O status (e.g., step S116 in FIG. 8). Thus, a WFDNW in which the MFP 10 serves as a G/O-status device (i.e., as a master) is configured. The CPU 32 prepares a wireless profile (e.g., an SSID, a password, an authentication method, and an encryption method) to be used in the WFDNW and stores the prepared wireless profile in the memory 34.

Subsequently, the CPU 32 transmits the SSID and password to be used in communication using the WFD system to the mobile terminal PT3 using an MFP 10(R/W)-mobile terminal PT3(CE) communication link (e.g., step S42 in FIG. 3).

Processing of subsequent steps may be substantially the same as the processing of the steps executed in Case A1 (see FIG. 5) according to the first illustrative embodiment. That is, wireless connection is established between the mobile terminal PT3 and the MFP 10 and the MFP 10 receives print data from the mobile terminal PT3. In this case, the MFP 10 executes the printing function without determining whether the printing function is available to the identified user after receiving the print data.

According to the third illustrative embodiment, as depicted in FIGS. 10 and 12, information indicating whether the user is allowed to perform a handover is associated with each of the plurality of pieces combined information included in the SFL table 40. Upon receipt of the execution request, the MFP 10 determines whether at least one of the plurality of the users is allowed to perform a handover (e.g., step S100 in FIG. 8). In Case C1, the MFP 10 determines that none of the users is allowed to perform a handover (e.g., the CPU 32 makes a negative determination (e.g., NO) in step S100 in FIG. 8). The MFP 10 transmits a Response signal including prohibition information to the mobile terminal PT1 using the P2P communication link (e.g., step S132 in FIG. 8). In Case C2, the MFP 10 determines that at least one of the plurality of users is allowed to perform a handover (e.g., the CPU 32 makes a positive determination (e.g., YES) in step S100 in FIG. 8). The MFP 10 transmits a Response signal including NG information to the mobile terminal PT1 using the P2P communication link (e.g., step S102 in FIG. 8). That is, according to the third illustrative embodiment, the MFP 10 may transmit appropriate one of the Response signal including NG information and the Response signal including prohibition information, in accordance with whether at least one of the plurality of the users is allowed to perform a handover. Therefore, the MFP 10 may transmit appropriate one of the Response signal including NG information and the Response signal including prohibition information to the mobile terminal PT1.

In Case C2 depicted in FIGS. 11 and 12, when the MFP 10 determines that the authentication is successful (e.g., the CPU 32 makes a positive determination (e.g., YES) in step S110 in FIG. 8), the MFP 10 further determines whether the identified user is allowed to perform a handover (e.g., step S112 in FIG. 8). In Case C2, the MFP 10 determines whether the printing function is available to the identified user (e.g., step S114 in FIG. 8). That is, according to the third illustrative embodiment, the MFP 10 may determine whether the MFP 10 transmits the SSID and password to the mobile terminal, in accordance whether the identified user is allowed to perform a handover and whether the printing function is available to the identified user. Thus, the MFP 10 may transmit the SSID and the password to the mobile terminal appropriately.

The plurality of pieces of combined information included in the SFL table 40 depicted in FIGS. 10 and 12 may be an example of "a plurality of pieces of associated information". The information indicating whether the user is allowed to perform a handover included in the SFL table 40 (e.g., "OK" or "NG") may be an example of "first information". The information indicating whether the printing function (or the scanning function) is available to the identified user included in the SFL table 40 (e.g., "OK" or "NG") may be an example of "second information". The Response signal including prohibition information may be an example of "third response information". In other words, the third response information may be information for notifying the terminal device that wireless connection using the second system cannot be established between the communication device and the terminal device. The processing executed in step S100 in FIG. 8 may be an example of "second determination processing". The processing executed in step S112 in FIG. 8 may be an example of "third determination processing". The processing executed in step S114 in FIG. 8 may be an example of "fourth determination processing". The processing executed in step S100 in FIG. 8 may be an example of processing executed by a "second determination portion". The processing executed in step S112 in FIG. 8 may be an example of processing executed by a "third determination portion". The processing executed in step S114 in FIG. 8 may be an example of processing executed by a "fourth determination portion".

Various embodiments of the disclosure have been described above; however, such embodiments are only examples and do not limit the scope of the appended claims. Examples of the modification and alternations of the above-described embodiment are described below.

In the above-described illustrative embodiments, in a predetermined situation (e.g., step S14 in FIG. 2, step S40 in FIG. 3, or step S116 in FIG. 8), the CPU 32 of the MFP 10 changes the operating status of the MFP 10 from the device status to the G/O status. Nevertheless, in other embodiments, for example, the CPU 32 of the MFP 10 may start serving as a G/O-status device as the power of the MFP 10 is turned on. In other embodiments, for example, the CPU 32 of the MFP 10 may perform a G/O negotiation with a CPU of a target terminal (e.g., the mobile terminal PT1) to determine one of the MFP 10 and the target terminal as a G/O-status device and the other of the MFP 10 and the target terminal as a CL-status device. In this case, the target terminal needs to be a WFD-enabled device. When the target terminal is determined as a G/O-status device, the CPU of the target terminal transmits, to the MFP 10, an SSID and password to be used in the WFDNW configured by the target terminal. In other embodiments, for example, in the predetermined situation, the target terminal may start operating as a G/O-status device without performing a G/O negotiation with the MFP 10. In this case, the CPU of the target terminal transmits the SSID and password to be used in the WFDNW configured by the target terminal. That is, generally speaking, when it is determined that the authentication information is correct, the first communication portion may be configured to perform communication of network information to be used in a particular wireless network, with the terminal device, via the first interface.

In the above-described illustrative embodiments, in the predetermined situation (e.g., step S14 in FIG. 2, step S40 in FIG. 3, or step S116 in FIG. 8), the MFP 10 starts serving as a G/O-status device. That is, the MFP 10 serves as a master in the WFDNW. Nevertheless, in other embodiments, for example, the MFP 10 may belong in a Wi-Fi network ("Wi-FiNW") configured by an access point ("AP") (not depicted), as a slave (more specifically, as a station). In this case, in step S16 in FIG. 2, in step S42 in FIG. 3, or in step S118 in FIG. 8, the CPU 32 of the MFP 10 may transmit an SSID and a password that are used in the Wi-FiNW configured by the AP, to the target terminal. In this case, the target terminal may establish wireless connection with the AP using the SSID and the password and perform wireless communication of target data with the MFP 10 using the Wi-FiNW configured by the AP. Generally speaking, when it is determined that the authentication information is correct, the first communication portion may be configured to perform communication of network information to be used in a particular wireless network, with the terminal device, via the first interface.

In the above-described illustrative embodiments, in each step of steps S32 in FIG. 3, S64 in FIG. 4, and S104 and S134 in FIG. 8, the CPU 32 of the MFP 10 transmits a Deactivation signal to the target terminal to disconnect the P2P communication link established between the MFP 10 and the target terminal. The manner of disconnecting the P2P communication link is not limited to the above example. In other embodiments, for example, in each step of steps S32 in FIG. 3, S64 in FIG. 4, and S104 and S134 in FIG. 8, the CPU 32 of the MFP 10 may turn off the power of the NFC I/F 20 or the CPU of the target terminal (e.g., the CPU 92 of the mobile terminal PT1) may turn off the power of the NFC I/F (e.g., the NFC I/F 80). Turning off of the power of the NFC I/F may forcefully disconnect the P2P communication link. In other embodiments, for example, the user of the target terminal may move the target terminal away from the MFP 10 out of the range in which the target terminal can perform communication using the NFC system with the MFP 10, to disconnect the P2P communication link. In this case, the CPU of the target terminal may display, on the display unit of the target terminal, a message prompting the user to move the target terminal away from the MFP 10. These variations may also be an example of the situation in which "the first communication link is disconnected".

In other embodiments, for example, it may be unnecessary for the memory 94 of the mobile terminal PT1 to store the SFL authentication information therein in advance. For example, in modifications to the first and third illustrative embodiments, the CPU 92 of the mobile terminal PT1 may display, on the display unit 74, an entry screen prompting the user to enter SFL authentication information. In this case, the user may enter the SFL authentication information by operating the operation unit 72 while the entry screen is displayed on the display unit 74. In the first and third illustrative embodiments, the CPU 92 of the mobile terminal PT1 may write the SFL authentication information entered through the entry screen, into the NFC I/F 80. For another example, in the second illustrative embodiment, upon establishment of the R/W-CE communication link, the CPU 92 of the mobile terminal PT1 may transmit the SFL authentication information entered through the entry screen to the MFP 10 using the R/W-CE communication link. Generally speaking, an authentication-information reception portion of the communication device may receive particular authentication information from the terminal device via the first interface after first response information is transmitted to the terminal device. When the first response information is received from the communication device, the authentication-information transmission portion of the terminal device may transmit the particular authentication information to the communication device via the first interface.

In other embodiments, for example, it may be unnecessary to store the SFL table 40 in the memory 34 of the MFP 10. That is, another device that is communicably connected to the MFP 10 may store an SFL table therein. In this case, upon receipt of SFL authentication information from the target terminal (e.g., step S36 in FIG. 3 of or step S108 in FIG. 8), the CPU 32 of MFP 10 may transmit the received SFL authentication information to the other device. A CPU of the other device may execute authentication and transmit an authentication result (e.g., succession or failure of the authentication) to the MFP 10. Generally speaking, when the particular authentication information is received from the terminal device, the first communication portion may be configured to execute the first determination process in which it is determined whether the particular authentication information is correct.

In other embodiments, mode switching of the NFC I/F 20 of the MFP 10 may occur. For example, as modifications of the first and third illustrative embodiments, as the power of the MFP 10 is turned on, the CPU 32 of the MFP 10 may allow the NFC I/F 20 to operate in the state where P2P mode is active and the other modes are inactive. Subsequent to this, after the CPU 32 of the MFP 10 transmits a Deactivation signal for disconnecting the P2P communication link (e.g., step S32 in FIG. 3 or step S104 in FIG. 8), the CPU 32 may change the state of the NFC I/F 20 to the state where the R/W mode is active and the other modes are inactive. In this case, after the CPU 32 of the MFP 10 transmits an SSID and a password to the target terminal (e.g., step S42 in FIG. 3 or step S118 FIG. 8) or after the CPU 32 of the MFP 10 transmits an NG notification to the target terminal (e.g., step S46 in FIG. 3 or step S122 in FIG. 8), the CPU 32 of the MFP 10 may return the state of the NFC I/F 20 to the P2P mode is active and the other modes are inactive. This variation may be another example of the processing executed by the state change portion of the communication device.

Likewise, in the second illustrative embodiment, for example, as the application startup operation and the execution instruction operation are performed, the CPU 92 of the mobile terminal PT1 may allow the NFC I/F 80 to operate in the state where the P2P mode is active and the other modes are inactive. Subsequent to this, upon receipt of a Response signal including NG information, the CPU 92 of the mobile terminal PT1 may change the state of the NFC I/F 80 to the state where the R/W mode is active and the other modes are inactive. In this case, after the CPU 92 of the mobile terminal PT1 receives an SSID and a password from the MFP 10 or after the CPU 92 of the mobile terminal PT1 receives an NG notification from the MFP 10, the CPU 92 of the mobile terminal PT1 may return the state of the NFC I/F 80 to the initial state where the P2P mode is active and the other modes are inactive. This variation may be an example of processing executed by the state change portion of the terminal device.

In the above-described illustrative embodiments, a P2P communication link is established between the MFP 10 and the target terminal as a first step. After the P2P communication link is disconnected, an R/W-CE communication link is established between the MFP 10 and the target terminal as a second step. The MFP 10 and the target terminal performs communication of an execution request and a Response signal using the P2P communication link, and performs communication of SFL authentication information, an SSID and a password using the R/W-CE communication link. In other embodiments, for example, the MFP 10 and the target terminal may perform all the above-described communication using the established P2P communication link (i.e., might not disconnect the P2P communication link established therebetween). In this case, as necessary, the CPU 32 of the MFP 10 may display, on the display unit 14, a screen for prompting the user to perform an appropriate operation. Likewise, the CPU of the target terminal may display, on the display unit 74, a screen for prompting the user to perform an appropriate operation. In other embodiments, for example, the MFP 10 and the target terminal may establish an R/W-CE communication link therebetween as a first step instead of establishing the P2P communication link. In this case, the MFP 10 and the target terminal may perform all the above-described communication using the established R/W-CE communication link (i.e., might not disconnect the R/W-CE communication link established therebetween). In other embodiments, for example, the MFP 10 and the target terminal may establish a P2P communication link therebetween as a first step. After the P2P communication link is disconnected, the MFP 10 and the target terminal may again establish a P2P communication link therebetween to perform all the above-described communication therebetween. Likewise, the MFP 10 and the target terminal may establish an R/W-CE communication link therebetween as a first step. After the R/W-CE communication link is disconnected, the MFP 10 and the target terminal may again establish an R/W-CE communication link therebetween to perform all the above-described communication therebetween.

In the above-described illustrative embodiments, each of the MFP 10 and the mobile terminals PT1, PT2, and PT3 includes the NFC IF (e.g., the NFC I/F 20 or 80) for performing communication using the NFC system. In other embodiments, for example, instead of the NFC I/F, each of the MFP 10 and the mobile terminals PT1, PT2, and PT3 may include, for example, a short-range wireless communication I/F that may be configured to perform short-range wireless communication using another standard, e.g., TransferJet™ (TransferJet™ is a trademark owned by Sony Corporation of Tokyo, Japan). This variation may be another example of the first interface.

In the above-described illustrative embodiments, in step S16 in FIG. 2, the CPU 32 of the MFP 10 transmits, to the target terminal, the Response signal including the SSID and password to be used in the WFDNW in which the MFP 10 serves as a G/O-status device. Nevertheless, in other embodiments, for example, in step S16 in FIG. 2, the CPU 32 of the MFP 10 may transmit a Response signal including one or more pieces of other information to the target terminal. For example, it is assumed that the target terminal serves as a G/O-status device. In this variation, the CPU 32 of the MFP 10 may transmit, to the target terminal, a Response signal including request information for requesting transmission of the SSID and the password. In this case, the target terminal that has received the Response signal may transmit the SSID and the password to the MFP 10. Generally speaking, the second response information may be any information that may relate to the network information.

In the first and second illustrative embodiments, the execution request that is transmitted to the MFP 10 by the CPU 92 of the mobile terminal PT1 includes the information indicating the particular function that is requested to be executed (e.g., step S60 in FIG. 4). Nevertheless, for example, in modifications to the first and second illustrative embodiments, the execution request that is transmitted to the MFP 10 by the CPU 92 of the mobile terminal PT1 may include information requesting execution of a handover but not include the information indicating the particular function that is requested to be executed. The execution request according to this variation may be another example of the "particular request information" and "request information".

The SFL table 40 may include a plurality of pieces of combined information in which only the user ID (e.g., "U1") and the password (e.g., "P1") are associated with each other. That is, the SFL table 40 might not necessarily include the availability information for printing function (e.g., "OK" or "NG") that indicates whether the printing function is available to the user, the availability information for scanning function (e.g., "OK" or "NG") that indicates whether the scanning function is available to the user, and the availability information for H/O (e.g., "OK" or "NG") that indicates whether the user is allowed to perform a handover. In this case, when the authentication using the SFL authentication information received from the target terminal is successful (e.g., YES in step S38 in FIG. 3 or YES in step S110 in FIG. 8), the CPU 32 of the MFP 10 may execute the requested function without determining whether the requested function is available to the user.

In other embodiments, for example, in each of steps S42 in FIG. 3 and S118 in FIG. 8, the CPU 32 may transmit the SSID and the password to the target terminal when the CPU 32 receives, from the target terminal, a request for transmission of the SSID and the password. That is, the CPU 32 may be configured not to transmit the SSID and the password to the target terminal until the CPU 32 receives the request for transmission of the SSID and the password from the target terminal, after the MFP 10 changes to the G/O status.

In other embodiments, for example, the MFP 10 may include a touch panel having functions of both the operation unit 12 and the display unit 14. Likewise, the mobile terminal PT1 may include a touch panel having functions of both the operation unit 72 and the display unit 74. That is, the operation unit 12 and the display unit 14 of the MFP 10 (or the operation unit 72 and the display unit 74 of the mobile terminal PT1) may consist of a single hardware.

The "communication device" is not limited to a multifunction device that is configured to perform the printing function and the scanning function (e.g., the MFP 10). In other embodiments, for example, the "communication device" may be a printer that may be configured to perform the printing function only or a scanner that may be configured to perform the scanning function only. The "communication device" may be a device (e.g., a PC, a server, a mobile terminal (e.g., a mobile phone, a smartphone, and a PDA)) that may be configured to perform one or more functions (e.g., an image displaying function or a data calculating function) other than the printing function and the scanning function. That is, the "communication device" may include any device that may be capable of performing communication using the NFC system and wireless LAN communication. The "terminal device" is also not limited to the mobile terminals PT1, PT2, and PT3, but may include any device that may be capable of performing short-range communication (e.g., communication using the NFC system) and wireless LAN communication.

In the above-described illustrative embodiments, the processing in all steps depicted in FIGS. 2, 3, 4, and 8 is implemented by software (e.g., the program). Nevertheless, in other embodiments, for example, the processing in at least one of the steps depicted in FIGS. 2, 3, 4, and 8 is implemented by hardware, for example, a logical circuit.

Further, the technical elements described in the specification and the drawings exhibit technical usability alone or in various combinations, and are not limited to those in the claims at the time of the application of the disclosure. Furthermore, the techniques described as examples in the specification or drawings may achieve a plurality of objects simultaneously, and has technical utility by achieving any one of these objects.

What is claimed is:

1. A non-transitory computer-readable medium storing computer-readable instructions for a terminal device, wherein the terminal device comprises:

a short-range wireless interface configured to perform wireless communication with a communication device using a short-range wireless communication protocol, the short-range wireless interface operable in a peer-to-peer mode and another mode;

a Wi-Fi interface configured to perform wireless communication with the communication device using a Wi-Fi-compliant communication protocol; and a processor, wherein the computer-readable instructions, when executed by the processor, cause the terminal device to perform:

transmitting, over a short-range wireless connection via the short-range wireless interface in the peer-to-peer mode, request information to the communication device, the request information to perform a function by the communication device;

receiving, via the short-range wireless interface in the peer-to-peer mode, first response information from the communication device in response to transmitting the request information;

in response to a termination and reactivation of the short-range wireless connection to the communication device, transmitting, via the short-range wireless interface in the other mode, authentication information to the communication device;

when the authentication information is determined to be correct by the communication device, performing, via the short-range wireless interface in the other mode, communication of network information to be used to connect with the Wi-Fi interface; and when the network information has been communicated, performing wireless communication with the communication device using the Wi-Fi interface.

2. The non-transitory computer-readable medium according to claim 1, wherein the instructions, when executed by the processor, cause the terminal device to perform:

in response to the termination, switching the peer-to-peer mode to the other mode; and in response to the communication of network information, switching the other mode to the peer-to-peer mode.

3. The non-transitory computer-readable medium according to claim 1, wherein the other mode is a card emulation mode.

4. The non-transitory computer-readable medium according to claim 1, wherein the other mode is a reader/writer mode.

5. The non-transitory computer-readable medium according to claim 1, wherein the instructions, when executed by the processor, cause the terminal device to perform:

receiving a disconnect signal from the communication device via the short-range wireless interface in the peer-to-peer mode.

6. The non-transitory computer-readable medium according to claim 1, wherein the short-range wireless interface is an NFC-compatible interface.

7. The non-transitory computer-readable medium according to claim 1, wherein the communication device is a multi-function device configured to perform at least one of a printing function and a scanning function, and the authentication information is information for performing the at least one of the printing function and the scanning function.

8. The non-transitory computer-readable medium according to claim 1, wherein the first response information causes the terminal device to transmit the authentication information via the short-range wireless interface in the other mode.

9. The non-transitory computer-readable medium according to claim 1, wherein the first response information results in the terminal device displaying instructions to move the terminal device away from and then close to the communication device to disconnect and then reconnect short-range wireless communication.

10. A terminal device comprising:

a short-range wireless interface configured to perform wireless communication with a communication device using a short-range wireless communication protocol, the short-range wireless interface operable in a peer-to-peer mode and another mode;

a Wi-Fi interface configured to perform wireless communication with the communication device using a Wi-Fi-compliant communication protocol;

a processor; and a memory storing computer-readable instructions therein, the computer-readable instructions, when executed by the processor, causing the terminal device to perform:

transmitting, over a short-range wireless connection via the short-range wireless interface in the peer-to-peer mode, request information to the communication device, the request information to perform a function by the communication device;

receiving, via the short-range wireless interface in the peer-to-peer mode, first response information from the communication device in response to transmitting the request information;

in response to a termination and reactivation of the short-range wireless connection to the communication device, transmitting, via the short-range wireless interface in the other mode, authentication information to the communication device;

when the authentication information is determined to be correct by the communication device, performing, via the short-range wireless interface in the other mode, communication of network information to be used to connect with the Wi-Fi interface; and when the network information has been communicated, performing wireless communication with the communication device using the Wi-Fi interface.

11. The terminal device according to claim 10, wherein the instructions, when executed by the processor, cause the terminal device to perform:

in response to the termination, switching the peer-to-peer mode to the other mode; and in response to the communication of the network information, switching the other mode to the peer-to-peer mode.

12. The terminal device according to claim 10, wherein the other mode is a card emulation mode.

13. The terminal device according to claim 10, wherein the other mode is a reader/writer mode.

14. The terminal device according to claim 10, wherein the instructions, when executed by the processor, cause the terminal device to perform:

receiving a disconnect signal from the communication device via the short-range wireless interface in the peer-to-peer mode.

15. The terminal device according to claim 10, wherein the short-range wireless interface is an NFC-compatible interface.

16. The terminal device according to claim 10, wherein the communication device is a multi-function device configured to perform at least one of a printing function and a scanning function, and the authentication information is information for performing the at least one of the printing function and the scanning function.

17. The terminal device according to claim 10, wherein the first response information causes the terminal device to transmit the authentication information via the short-range wireless interface in the other mode.

18. The terminal device according to claim 10, wherein the first response information results in the terminal device displaying instructions to move the terminal device away from and then close to the communication device to disconnect and then reconnect short-range wireless communication.

19. A method performed by a terminal device, wherein the terminal device comprises:
- a short-range wireless interface configured to perform wireless communication with a communication device using a short-range wireless communication protocol, the short-range wireless interface operable in a peer-to-peer mode and another mode; and
- a Wi-Fi interface configured to perform wireless communication with the communication device using a Wi-Fi-compliant communication protocol, the method comprising:
- transmitting, over a short-range wireless connection via the short-range wireless interface in the peer-to-peer mode, request information to the communication device, the request information to perform a function by the communication device;
- receiving, via the short-range wireless interface in the peer-to-peer mode, first response information from the communication device in response to transmitting the request information;
- in response to a termination and reactivation of the short-range wireless connection to the communication device, transmitting, via the short-range wireless interface in the other mode, authentication information to the communication device;
- when the authentication information is determined to be correct by the communication device, performing, via the short-range wireless interface in the other mode, communication of network information to be used to connect with the Wi-Fi interface; and
- when the network information has been communicated, performing wireless communication with the communication device using the Wi-Fi interface.

20. The method according to claim 19, further comprising:
- in response to the termination, switching the peer-to-peer mode to the other mode; and
- in response to the communication of network information, switching the other mode to the peer-to-peer mode.

* * * * *